(12) United States Patent
Hanabusa et al.

(10) Patent No.: US 7,437,132 B2
(45) Date of Patent: Oct. 14, 2008

(54) RECEIVING DEVICE, SEMICONDUCTOR INTEGRATED CIRCUIT, TRANSMITTING/RECEIVING DEVICE, TRANSPORT APPARATUS PORTABLE TRANSMITTING/RECEIVING DEVICE, COMMUNICATION SYSTEM AND RECEIVING METHOD

(75) Inventors: Mikio Hanabusa, Kanagawa (JP); Kazunori Watanabe, Kanagawa (JP); Kaoru Ishida, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 486 days.

(21) Appl. No.: 11/212,732

(22) Filed: Aug. 29, 2005

(65) Prior Publication Data

US 2006/0073857 A1    Apr. 6, 2006

(30) Foreign Application Priority Data

Oct. 4, 2004    (JP)    ............................. 2004-291981

(51) Int. Cl.
*H04B 1/16* (2006.01)
*H04B 17/00* (2006.01)

(52) U.S. Cl. ................. 455/130; 455/226.2; 455/343.2; 455/574; 340/7.32

(58) Field of Classification Search .............. 455/67.11, 455/67.13, 226.1–226.4, 343.1–343.2, 574; 340/7.32, 7.33
See application file for complete search history.

(56) References Cited

U.S. PATENT DOCUMENTS

| | | | |
|---|---|---|---|
| 4,903,319 A | * | 2/1990 | Kasai et al. .................. 455/574 |
| 5,487,181 A | * | 1/1996 | Dailey et al. ................ 455/90.2 |
| 5,621,412 A | | 4/1997 | Sharpe et al. |
| 5,765,114 A | * | 6/1998 | Fukuda ......................... 455/574 |
| 5,799,256 A | | 8/1998 | Pombo et al. |
| 6,263,200 B1 | * | 7/2001 | Fujimoto ................... 455/343.5 |
| 6,339,381 B1 | | 1/2002 | Takikita |

(Continued)

FOREIGN PATENT DOCUMENTS

JP    2000-278201 A    10/2000

(Continued)

OTHER PUBLICATIONS

European Search Report Issued in corresponding European Patent Application No. EP 05 01 8529, dated Sep. 27, 2006.

*Primary Examiner*—Simon D Nguyen
(74) *Attorney, Agent, or Firm*—McDermott Will & Emery LLP

(57) ABSTRACT

A receiving device includes a receiver circuit for outputting a received signal as a reception electric field intensity signal, an operation control circuit for controlling an operation of the receiver circuit, and an intermittent reception control circuit for outputting a periodic signal. A comparator circuit holds a first threshold indicating that the receiving device has entered a communication area and a second threshold indicating a start of a continuous electric field intensity measurement. If the reception electric field intensity signal is lower than the second threshold, the operation control circuit makes the receiver circuit perform intermittent operation. If the reception electric field intensity signal is equal to or higher than the second threshold, the operation control circuit makes the receiver circuit perform a continuous operation. If the reception electric field intensity signal is equal to or higher than the first threshold, the operation control circuit makes the demodulation circuit perform an operation.

45 Claims, 23 Drawing Sheets

U.S. PATENT DOCUMENTS

| | | |
|---|---|---|
| 6,653,946 B1 | 11/2003 | Hassett |
| 7,209,728 B2 * | 4/2007 | Ogura .................... 455/343.1 |
| 7,295,827 B2 * | 11/2007 | Liu et al. ................ 455/343.2 |
| 2002/0101372 A1 | 8/2002 | Terashima et al. |

FOREIGN PATENT DOCUMENTS

| | | |
|---|---|---|
| JP | 2001-094505 | 4/2001 |
| JP | 2002-152808 | 5/2002 |
| JP | 2002-260034 A | 9/2002 |
| JP | 2003-169011 | 6/2003 |
| JP | 2003-209616 | 7/2003 |

* cited by examiner

RECEIVING DEVICE, SEMICONDUCTOR INTEGRATED CIRCUIT, TRANSMITTING/RECEIVING DEVICE, TRANSPORT APPARATUS PORTABLE TRANSMITTING/RECEIVING DEVICE, COMMUNICATION SYSTEM AND RECEIVING METHOD

CROSS-REFERENCE TO RELATED APPLICATION

This application claims priority under 35 U.S.C. § 119(a) on Japanese Patent Application No. 2004-291981 filed on Oct. 4, 2004 the entire contents of which are hereby incorporated by reference. Also incorporated by reference are the entire contents of Japanese Patent Application No. 2005-179779 filed on Jun. 20, 2005.

BACKGROUND OF THE INVENTION

1. Field of the Invention

The present invention relates to a receiving device used for small area communication, represented by dedicated short range communication and wireless LAN communication, and a transmitting/receiving device, a transport apparatus and communication system including the receiving device.

2. Prior Art

FIG. 23 is a block diagram illustrating the configuration of known vehicle-mounted communication system used for dedicated short range communication and the like. The vehicle-mounted communication system of FIG. 23 includes a control section 171 including a CPU 172 and a signal processing circuit 173, a transmitter 174, a circulator 175 connected to an antenna 176, a receiver 177 and an oscillator 178. Moreover, a power supply circuit 179 for supplying a power supply voltage is connected to the signal processing circuit 173, the CPU 172, the receiver 177 and the oscillator 178. A power supply voltage is supplied to the transmitter 174 via a switch circuit (SW circuit) 180 (see, for example, Japanese Laid-Open Publication No. 2000-278201).

Next, the operation of the known vehicle-mounted communication system will be further described.

FIG. 24 is a diagram illustrating the operation of the known vehicle-mounted communication system. In an ETC (electric toll collection) system or the like, when a vehicle with a vehicle-mounted communication system is outside of a communication area of an antenna of a base station (roadside wireless equipment), a timer function of the CPU 172 is operated. When a predetermined time set in the timer has lapsed, the vehicle-mounted communication system is turned to a sleep mode. In the sleep mode, the CPU 172 and the oscillator 178 are stopped by control of the signal processing circuit 173. At the same time, the switch circuit 180 is turned OFF and a power supply to the transmitter 174 is stopped.

In this state, when the vehicle with a vehicle-mounted communication system approaches the communication area of the antenna of the base station (roadside wireless equipment) and the antenna 176 of the vehicle-mounted communication system receives a call data signal from the base station (roadside wireless equipment), in response to the data signal, the signal processing circuit 173, in response to the received data signal, operates the oscillator 178 and the CPU 172 and also turns ON the switch circuit 180 to make the transmitter 174 supply power. Thus, the vehicle-mounted communication system becomes in an active mode and capable of transmission to the base station.

When transmission to the base station has been completed, the vehicle-mounted communication system becomes in a halt mode. In the halt mode, while the oscillator 178 stays in an operation state, only operations of the CPU 172 and the transmitter 174 are stopped. When the vehicle-mounted communication system re-starts its operation, the oscillator 178 is in an operation and thus no waiting time is required to re-start an operation of the oscillator 178. Accordingly, the vehicle-mounted communication system can be returned to an active mode from a halt mode.

In the known example, a halt mode is set between a sleep mode and an active mode. Thus, power consumption in a non-communication state can be suppressed and also the vehicle-mounted communication system can quickly return to an active mode in response to a request for re-connection, so that a response speed with respect to a re-connection request can be increased.

SUMMARY OF THE INVENTION

More and more functions are expected to be incorporated into a communication system in future and thus reduction in power consumption is strongly demanded. Specifically, development of a portable receiving device for receiving a signal transmitted from a base station is expected. To achieve a portable receiving device, reduction in power consumption becomes more important than ever. However, in a known power consumption reduction technology for a vehicle-mounted communication system disclosed in Japanese Laid-Open Publication No. 2000-278201, a threshold is provided for reception electric field intensity. Thus, it is a transmitter, an oscillator, a CPU or like circuit that can be stopped based on the threshold in a non-communication state, and other circuits such as a receiver have to be ON all the time to judge whether or not the vehicle-mounted communication system is within a communication area of an antenna of a base station. Therefore, in the known technology, power consumption of a receiver circuit can not be reduced.

It is therefore an object of the present invention to solve the above-described problem and to provide a receiving device and a communication system which allow reduction in power consumption in a non-communication state without reducing a speed of reception of a signal transmitted from a base station, and also provide a communication method using the receiving device and the communication system.

To solve the above described problems, the present invention is characterized in that in a receiving device provided in a communication system (moving station), two or more thresholds are set for a reception electric field intensity of an electric wave received by the receiving device.

Thus, only necessary circuits for communication are started up in turn using a comparison result for the reception electric field intensity using the thresholds, location information for the receiving device, the moving speed of the receiving device and the like, so that power supply to unnecessary circuits are stopped when the receiving device does not communicate with a base station. Thus, power consumption can be reduced.

Specifically, the receiving device of the present invention is a receiving device for receiving a signal transmitted from a base station and includes: a receiver circuit for outputting a reception electric field intensity of a signal received via an antenna as a reception electric field intensity signal; a comparator circuit for comparing a level of the reception electric field intensity signal output from the receiver circuit using a first threshold indicating that the receiving device is in a communication area and a second threshold which is lower than the first threshold and indicates a continuous field measurement level and outputting a result of the comparison; an intermittent reception control circuit for outputting a periodic signal for intermittently operating the receiver circuit; and an operation control circuit for controlling an operation of the receiver circuit based on a comparison result of the comparator circuit. In the above-described structure, based on the comparison result of the comparator circuit, if the level of the reception electric field intensity signal is lower than the second threshold, the operation control circuit makes the receiver circuit perform intermittent operation based on the periodic signal and if the level of the reception electric field intensity signal is equal to or higher than the second threshold, the operation control circuit makes the receiver circuit perform a continuous operation.

As described above, when the electric field intensity of a received signal is weak, the receiver circuit is intermittently operated. Thus, compared to the case where the receiver circuit is continuously operated, power consumption can be reduced. Furthermore, when the level of the electric field intensity signal is equal to or higher than the second intensity, by operating the receiver circuit, a delay of the receiving operation can be prevented.

Moreover, the receiver circuit further includes the function of amplifying and outputting the received signal may further include a demodulator circuit for demodulating the amplified signal and outputting the signal as a modulation signal. In the structure including the demodulator circuit, the operation control circuit preferably controls an operation of the demodulator circuit. In such a case, the operation of the demodulator circuit can be appropriately stopped, so that power consumption for the power in the demodulator circuit can be reduced.

Moreover, in the above-described receiving device of the present invention, it is preferable that, based on the comparison result of the comparator circuit, the operation control circuit operates the demodulator circuit when the level of the reception electric field intensity signal exceeds the first threshold. Therefore, a received signal can be demodulated without delay.

Furthermore, it is preferable that, based on the comparison result of the comparator circuit, the operation control circuit supplies a first clock signal to the demodulator circuit when the level of the reception electric field intensity signal exceeds the first threshold. As has been described, the operation control circuit can supply a first clock signal to the demodulator circuit. Thus, the present invention is effective when the demodulator circuit is a digital circuit.

Moreover, it is preferable that the above-described receiving device of the present invention, a signal processing circuit for processing the demodulation signal output from the demodulator circuit; and a processing unit for arithmetically processing the demodulation signal processed by the signal processing circuit. In this structure, based on the comparison result of the comparator circuit, the operation control circuit supplies a second clock signal to the signal processing circuit and the processing unit to control the signal processing circuit and the processing unit when the level of the reception electric field intensity signal is lower than the second threshold. Thus, with appropriate control of the second clock signal by the operation control circuit, the operations of the signal processing circuit and the processing unit can be controlled. For example, when the level of a reception electric field intensity signal is the second threshold or less, supply of the second clock signal is stopped. Thus, the operations of the signal processing circuit and the processing unit can be stopped, so that power consumption of each circuit can be reduced.

Moreover, it is preferable that the second threshold has a first boundary value which is smaller than the second threshold and a second boundary value which is larger than the second threshold. In such a case, the receiver circuit can be shifted from an intermittent operation to a continuous operation when the level of the reception electric field intensity signal is increased to exceed the second boundary value. On the other hand, the receiver circuit can be shifted from a continuous operation to an intermittent operation when the level of the reception electric field intensity signal is reduced to be equal to the first boundary value. That is, the first boundary value and the second boundary value can be defined as a power OFF judgment level of the receiver circuit and a power ON judgment level of the receiver circuit, respectively. As has been described, by providing boundary values, i.e., upper and lower limits of the second threshold, effects of noise contained in the electric field intensity of a received signal on the operation of the receiver circuit can be removed. Therefore, even when the reception electric field intensity signal fluctuates up and down due to noise, the generation of an operating error of the receiver circuit can be prevented and a stable operation of the receiver circuit can be performed.

Moreover, the above-described receiving device of the present invention is characterized by further including a speed detector for detecting a moving speed of the receiving device (or communication system) and outputting the detected speed as a speed signal. Furthermore, it is preferable that the comparator circuit changes the second threshold according to the speed signal. Accordingly, it is possible to flexibly cope with change in the moving speed of the receiving device (communication system) output from the speed detector so that the operation of the receiver circuit is not delayed. In such a structure, when the moving speed of the receiving device (communication system) is increased, it is preferable that the comparator circuit changes the second threshold so that a difference between the first threshold and the second threshold becomes larger. When the moving speed of the receiving device (communication system) is high, the receiving device approaches the base station in a short time. Thus, by reducing the second threshold, the receiver circuit can be shifted from an intermittent operation to a continuous operation at an earlier time point. Accordingly, the receiving device becomes in a communication standby state in an earlier time point, so that communication with the base station can be started without delay. On the other hand, when the moving speed of the receiving device (communication system) is low, it takes longer time for the receiving device to approach the base station. Thus, by increasing the second threshold, the cycle of an intermittent operation of the receiver circuit can be relatively increased. Accordingly, when the moving speed of the receiving device (communication system) is low, the second threshold is increased, so that power consumption of the receiver circuit can be reduced.

Moreover, in the above-described receiving device of the present invention, it is preferable that the intermittent reception control circuit changes the periodic signal according to the reception electric field intensity signal. In such a structure, when the level of the reception electric field intensity signal becomes high, the intermittent control circuit shortens a cycle of the periodic signal. Accordingly, the receiver circuit is operated at shorter intervals and it is possible to cope with change in reception electric field intensity signal more quickly. Thus, a time point where the reception electric field intensity exceeds the second threshold can be judged with a reduced level of errors, so that delay of the operation of the receiver circuit can be prevented.

Moreover, it is preferable that the receiving device of the present invention further includes a speed detector for detecting a moving speed of the receiving device (communication system) and outputting the detected speed as a speed signal. Furthermore, in such a structure, it is preferable that the intermittent reception control circuit changes the periodic signal according to the speed signal. Thus, the intermittent operation cycle of the receiver circuit can be changed according to change in the moving speed of the receiving device (communication system) and delay of the operation of the receiver circuit can be prevented. For example, in the above-described structure, when the moving speed of the receiving device (communication system) is increased, a distance between the receiving device and the base station is quickly reduced and the cycle of an intermittent operation can be reduced. Accordingly, when the moving speed of the receiving device is high, the receiver circuit is operated at short intervals, so that the receiver circuit can be effectively shifted from an intermittent operation to a continuous operation without delay.

Moreover, the receiving device of the present invention is characterized by further including: a memory for storing location information for the base station; and a location detector for detecting a location of the receiving device. In this structure, it is preferable that the intermittent reception control circuit changes the periodic signal according to a result of comparison between the location of the base station stored in the memory and the result of detection by the location detector. Thus, a distance between the base station and the receiving device is appropriately understood and the cycle of an intermittent operation can be changed, so that delay of shift of the receiving device to a continuous operation can be prevented.

For example, it is preferable that the intermittent reception control circuit shortens a cycle of the intermittent operation of the receiving device when a distance between the base station and the receiving device is decreased. Thus, the receiver circuit can measure the reception electric field intensity at short intervals, so that the receiver circuit can be effectively shifted from an intermittent operation to a continuous operation without delay.

Furthermore, in the above-described structure, it is preferable that when the receiving device passes a new base station, the location of the new base station is written in the memory. Thus, location information for a base station which has not been stored is newly stored in the memory and therefore, when the receiving device passes the base station for the second and subsequent times, the receiving device can recognize the base station as an already known base station. Thus, delay of an operation of the receiver circuit can be avoided.

Moreover, the receiving device of the present invention is characterized by further including a reception control circuit for controlling a receiving time which it takes for the receiver circuit to receive the signal via the antenna. In this structure, it is preferable that the comparator circuit compares a level of the reception electric intensity signal with, in addition to the first threshold and the second threshold, a third threshold which is lower than the second threshold and indicates whether or not the signal to be received exists. In this case, it is preferable that the comparison result of the comparator circuit, when the level of the reception electric field intensity signal exceeds the third threshold, the reception control circuit increases the receiving time so that the receiving time becomes longer than the receiving time when the level of the reception electric field intensity signal is equal to or lower than the third threshold. Thus, for example, even when signals of a plurality of communication frequencies are received, effects of other frequency signals can be removed.

Moreover, it is preferable that the intermittent reception control circuit increases a cycle of the periodic signal when the level of the reception electric field intensity signal is equal to or lower than the third threshold.

Moreover, in the receiving device of the present invention, when signals of a plurality of frequencies are received, the comparator circuit performs comparison of each of the signals of a plurality of frequencies with threshold. In such a case, the comparison result of the comparator circuit, when the level of the reception electric field intensity signal for one of the signals of a plurality of frequencies exceeds the third threshold, it is preferable that the reception control circuit increases an operation time in an intermittence operation of the receiver circuit so that the operation time becomes longer than the operation time when the level of the reception electric field intensity signal is equal to or lower than the third threshold. Thus, a signal of the strongest frequency can be received over a sufficient time for removing effects of signals of other frequencies. Therefore, a signal of a frequency that a base station uses can be reliably received.

Moreover, there may be cases where the receiving device of the present invention further includes a reception control circuit for controlling a receiving time of a received signal and signals of a plurality of frequencies are received. In such a case, the comparator circuit performs comparison of each of the signals of a plurality of frequencies. The comparison result of the comparator circuit, when the level of one of the plurality of reception electric field intensity signals exceeds the third threshold, it is preferable that the reception control circuit increases the receiving time of the receiver circuit for signals of other frequencies so that the receiving time becomes longer than the receiving time when each of the signals of a plurality of frequencies is equal to or lower than the third threshold. Thus, effects of signals of other frequencies can be removed and a signal of a frequency transmitted from a base station can be reliably received.

Moreover, it is preferable that the receiving device of the present invention further includes a reception control circuit for measuring a rate of change in the reception electric field intensity and the reception control circuit changes, according to the rate of change, a receiving time which it takes for the receiver circuit to receive the signal. Thus, a signal to be received can be more reliably received.

Moreover, in the present invention, when signals of a plurality of frequencies are received, it is preferable that the comparator circuit performs comparison of each of the signals of a plurality of frequencies with threshold. Furthermore, when the rate of change in the reception electric filed intensity of one of signals of the plurality of frequencies is increased, an operation time of an intermittent operation of a receiver circuit for the frequency signal is increased, so that a signal of a frequency transmitted from a base station can be reliably received.

Moreover, the receiving device of the present invention is characterized by further including: a reception control circuit for controlling a receiving time which it takes for the receiver circuit to receive a signal via an antenna; a memory for storing a location of a base station and frequency information for a signal transmitted from the base station; and a location detector for detecting a location of the receiving device. In this structure, it is preferable that the reception control circuit changes the receiving time according to a result of comparison between the location of the base station stored in the memory and a detection result of the location detector. Thus, it becomes possible to keep a delay time of a start of receiving a signal small without effects of noise or obstacles.

Moreover, according to the present invention, when the distance between the base station and the receiving device is reduced, it is preferable that the receiving time for a signal transmitted from the base station is increased. Thus, delay of a start of receiving a signal can be reduced.

Moreover, it is preferable that the receiving device of the present invention further includes a station selector for selecting, from signals of a plurality of frequencies, a frequency signal which the receiver circuit is to receive, based on an output of the reception control circuit. In this structure, as a result of a comparison of the comparator circuit, the station selector can select, from the signals of a plurality of frequencies, a frequency signal having a reception electric field intensity level exceeding the second threshold and the receiver circuit can receive the selected frequency signal.

Moreover, it is preferable that a communication system is formed so as to include: the above-described receiving device; an antenna for receiving a signal transmitted from a base station; and a transmitting device for outputting (transmitting) a signal input (received) via the antenna and processed to the base station via the antenna and be capable of transmitting/receiving a signal.

Moreover, it is preferable that the above-described communication system of the present invention is integrated on a semiconductor substrate, thereby forming a semiconductor integrated circuit. Thus, a transmitting/receiving IC including a receiving device and a transmitting device, a control section including a signal processing circuit, a CPU, and an antenna can be mounted on a chip.

Moreover, it is preferable that the receiving device is installed in a transport apparatus such as a car. In such a case, the communication system can obtain power from a driving motor that the transport apparatus includes and, when the transport apparatus is moving, information can be transmitted/received to/from a fixed base station without delay.

Moreover, the above-described receiving device may be used for a transportable wireless communication system or other communication systems.

Moreover, the receiving device of the present invention is characterized by further including a notifying section for notifying, the comparison result of the comparator circuit, that the level of the reception electric field intensity signal has exceeded the second threshold. For example, in an ETC system, when the receiving device approaches a tollgate, i.e., a base station, it is notified that the level of the reception electric field intensity signal has exceeded the second threshold, thereby preventing a failure of placing an external component such as a pay card or the like. Therefore, exchange of information at the tollgate (base station) can be reliably performed.

A receiving method according to the present invention is a method for receiving a signal using a receiving device for receiving a signal transmitted from a base station, and includes: a first step of receiving the signal via an antenna by a receiver circuit; a second step of outputting a reception electric field intensity of the received signal as a reception electric field intensity signal from the receiver circuit; a third step of comparing the level of the reception electric field intensity signal with a first threshold indicating that the receiving device is in a communication area and a second threshold which is lower than the first threshold and indicates a continuous field measurement start level; a fourth step of making, if the level of the reception electric field intensity signal is lower than the second threshold, as a result of the comparison, the receiver circuit perform an intermittent operation; and a fifth step of making, if the level of the reception electric field intensity signal is equal to or higher than the second threshold, as a result of the comparison, the receiver circuit perform a continuous operation.

As described above, according to the method of the present invention, when the electric filed intensity of a received signal is weak, the receiver circuit is made to perform an intermittent operation. Thus, compared to the case where the receiver circuit is performed for all the time, power consumption can be reduced. Furthermore, when the level of the electric field intensity signal becomes equal to or higher than the second threshold, the receiver circuit is operated, so that delay of a reception operation can be prevented.

Moreover, the receiving method of the present invention further includes a sixth step of making, if the level of the reception electric field intensity signal is equal to or higher than the first threshold, as a result of the comparison, a demodulator circuit for demodulating the signal received by the receiver circuit perform an operation.

Thus, when the receiving device enters a communication area, reception of a signal can be started without delay. Moreover, when the level of the reception electric field intensity signal is lower than the first threshold, the operation of the demodulator circuit can be stopped. In such a case, power consumption at the power of the demodulator circuit can be reduced.

Moreover, according to the present invention, it is preferable that in the sixth step, a clock signal for demodulation operation is given to the demodulator circuit. Thus, providing a clock signal to the demodulator circuit is effective when the demodulator circuit is a digital circuit.

In the receiving method of the present invention, it is preferable that each of the fourth step and the fifth step includes the step of giving a clock signal to a signal processing circuit for processing a signal output from the receiver circuit and a processing unit for arithmetically processing the signal.

It is preferable that the third step includes the step of comparing the level of the reception electric field intensity signal with the second threshold by hysterisis control using a first boundary value which is lower than the second threshold and a second boundary value which is higher than the second threshold. In such a case, when the reception electric field intension signal is increased and exceeds the second boundary level, the receiver circuit can be shifted from an intermittent operation to a continuous operation. On the other hand, when the reception electric field intensity signal is reduced and becomes equal to the first boundary level, the receiver circuit can be shifted from a continuous operation to an intermittent operation. That is, the first and second boundary values can be defined as the power OFF judgment level of the receiver circuit and the power ON judgment level of the receiver circuit, respectively. With the boundary values, i.e., upper and lower limits of the second threshold provided, effects of noise contained in the electric field intensity of a received signal on an operation of the receiver circuit can be removed. Therefore, even when the reception electric field intensity signal fluctuates due to noise, the occurrence of an operation error of the receiver circuit can be prevented and a stable operation of the receiver circuit can be provided.

Moreover, it is preferable that the receiving method of the present invention includes before the third step: a seventh step of detecting a moving speed of the receiving device and outputting the moving speed as a speed signal; and an eighth step of changing the second threshold according to the speed signal. Thus, it is possible to flexibly cope with change in the moving speed of the receiving device (communication system) output from the speed detector so that the operation of the receiver circuit is not delayed.

Moreover, according to the receiving method of the present invention, it is preferable that in the eighth step, when the moving speed is increased, the second threshold is changed so that a difference between the first threshold and the second threshold is increased. Thus, it is possible to flexibly cope with change in the moving speed of the receiving device (communication system) output from the speed detector so that the operation of the receiver circuit is not delayed.

Moreover, according to the receiving method of the present invention, it is preferable that the fourth step includes a ninth step of changing a cycle of the intermittent operation according to the reception electric field intensity signal. According to the receiving method, in the ninth step, when the level of the reception electric field intensity signal is high, the cycle of the intermittent operation can be shortened. Thus, a time point when the reception field intension exceeds the second threshold can be judged with reduced level of errors, so that delay of an operation of the receiver circuit can be prevented.

Moreover, it is preferable that the receiving method of the present invention further includes: a tenth step of detecting a moving speed of the receiving device and outputting the detected moving speed as a speed signal; and an eleventh step of changing a cycle of the intermittent operation according to the speed signal. Thus, the intermittent operation cycle of the receiver circuit can be changed according to change in the moving speed of the receiving device (communication system) and delay of the operation of the receiver circuit can be prevented.

Moreover, according to the receiving method of the present invention, it is preferable that in the eleventh step, when the moving speed is increased, the cycle of the intermittent operation is shortened. Accordingly, when the moving speed of the receiving device is high, the receiver circuit is operated at short intervals, so that the receiver circuit can be effectively shifted from an intermittent operation to a continuous operation without delay.

The receiving method of the present invention is characterized by further including: the step of detecting a location of the receiving device; and the step of calculating a distance between a location of the base station stored in the receiving device and the detected location of the receiving device. In this case, it is preferable that the fourth step further includes a twelfth step of changing a cycle of the intermittent operation according to the calculated distance. Thus, a distance between the base station and the receiving device is appropriately understood and the cycle of an intermittent operation can be changed, so that delay of shift of the receiving device to a continuous operation can be prevented.

Moreover, according to the above-described receiving method of the present invention, it is preferable that in the twelfth step, when the distance between the base station and the receiving device is reduced, the cycle of the intermittent operation is shortened.

Moreover, according to the receiving method of the present invention, the third step further includes the step of comparing the level of the reception electric field intensity signal with a third threshold which indicates whether or not a signal to be received exists and is lower than the second threshold. In this case, it is preferable that the fourth step includes the step of increasing, if the level of the reception electric field intensity signal exceeds the third threshold, as a result of the comparison, a receiving time of the receiver circuit so that the receiving time is longer than a receiving time when the level of the reception electric field intensity signal is equal to or lower than the third threshold. Thus, for example, even when signals of a plurality of frequencies are received, effects of signals of other frequencies can be removed.

Moreover, according to the receiving method of the present invention, it is preferable that the fourth step includes the step of changing a receiving time which it takes for the receiver circuit to receive the signal, according to a rate of change in the reception electric field intensity. Thus, reception of a signal to be received can be more reliably performed.

Moreover, the above-described receiving method of the present invention may further include: the step of detecting a location of the receiving device; and the step of calculating a distance between a location of the base station stored in the receiving device and the detected location of the receiving device. In this case, it is preferable that the fourth step includes the step of changing a receiving time which it takes for the receiver circuit to receive the signal according to the calculated distance. Thus, a delay time of a start of receiving signal can be kept small without being influenced by noise or obstacles.

It is preferable that the receiving method of the present invention further includes, after the third step, the step of selecting, from the plurality of received signals, a signal with a reception electric field intensity signal having a level equal to or higher than the second threshold.

Moreover, according to the receiving method of the present invention, it is preferable that the fifth step includes the step of notifying that the level of the reception electric field intensity signal is equal to or higher than the second threshold. For example, in an ETC system, when the receiving device approaches a tollgate, i.e., a base station, it is notified that the level of the reception electric field intensity signal has exceeded the second threshold, thereby preventing a failure of placing an external component such as a pay card or the like. Thus, exchange information at the tollgate can be reliably performed.

BRIEF DESCRIPTION OF THE DRAWINGS

FIG. 23 is a block diagram illustrating the configuration of a known communication system used for dedicated short range communication and the like.

DESCRIPTION OF THE PREFERRED EMBODIMENTS

Hereinafter, embodiments of a receiving device according to the present invention will be described with reference to the accompanying drawings.

First Embodiment

Figure 1:
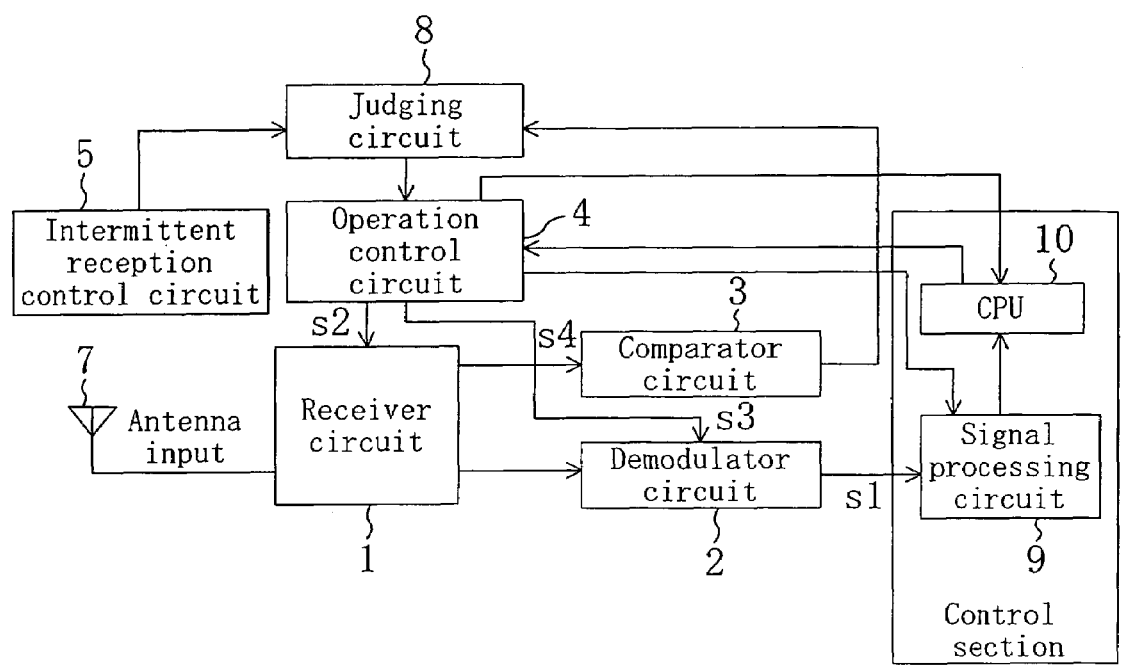
FIG. 1 is a block diagram illustrating the configuration of an exemplary receiving device according to a first embodiment of the present invention.

FIG. 1 is a block diagram illustrating an exemplary configuration of a receiving device according to a first embodiment of the present invention. As shown in FIG. 1, the receiving device of this embodiment includes a receiver circuit 1 for receiving a signal transmitted from a base station (not shown) via an antenna 7 and outputting an electric field intensity of a received signal as a reception electric field intensity signal and a demodulator circuit 2 for demodulating the signal processed by the receiver circuit 1. Moreover, the receiving device of this embodiment also includes a comparator circuit 3 for comparing a level of the reception electric field intensity signal output from the receiver circuit 1 to a first threshold and a second threshold and making a judgment and an intermittent reception control circuit 5 for outputting a signal for intermittently operating the receiver circuit 1. In this case, the intermittent reception control circuit 5, in other words, outputs an intermittent cycle signal for making the receiver circuit 1 intermittently receive a reception electric field intensity signal. Furthermore, the receiving device of this embodiment includes an operation control circuit 4 for controlling supply of power supply voltage to the receiver circuit 1 and the demodulator circuit 2, a judging circuit 8 for controlling an output of the operation control circuit 4 according to a comparison result by the comparator circuit 3, a signal processing circuit 9 and a CPU (processing unit) 10 each for processing a demodulation signal output from the demodulator circuit 2. Note that the judging circuit 8 is formed of a logic circuit or the like.

In the receiving device, when it is judged that the level of a reception electric field intensity signal is equal to or lower than the second threshold in the comparator circuit 3, the operation control circuit 4 intermittently supplies power to the receiver circuit 1 according to an output from the intermittent reception control circuit 5. The second threshold will be described later.

Moreover, in the comparator circuit 3, when it is judged that the level of a reception electric field intensity signal exceeds the second threshold, the operation control circuit 4 performs control so that power is supplied to the receiver circuit 1 at all the time regardless of an output of the intermittent reception control circuit 5. In this case, the judging circuit 8 judges which of intermittent reception or continuous reception the receiver circuit 1 is to perform, based on a judgment result of the comparator circuit 3 and an intermittent cycle signal of the intermittent reception control circuit 5, and then outputs a result of the judgment to the operation control circuit 4.

Thus, the receiving device of this embodiment is characterized in that the intermittent reception control circuit 5 is provided therein and intermittent operation of the receiver circuit 1 is effectively adopted. In this case, the first threshold indicates a communication start level (reception start level) for communication with a base station and the second threshold indicates a continuous electric field intensity measurement start level (receiver circuit's operation start level).

For example, a receiving device according to the present invention is used for a communication system for a mobile station such as an ETC (electric toll collection) system or a DRSC (dedicated short range communication) system, which receives a signal containing information transmitted from a base station or processes a received signal and transmits the processed signal to a base station. The mobile station is installed in a vehicle or carried by a person and is communicable when a distance between the base station and the mobile station is within a range of an approximately 20 m or less.

Figure 2:
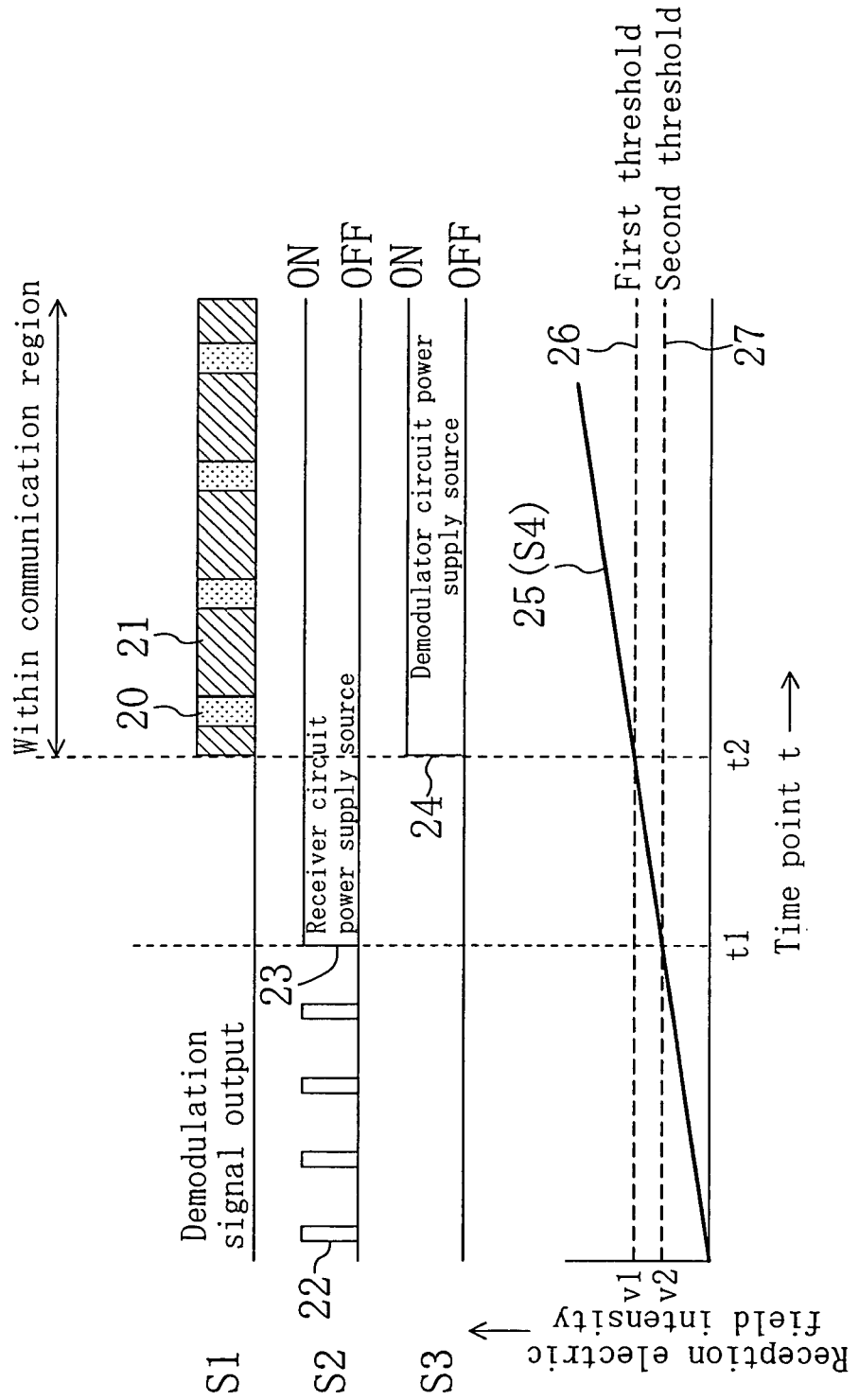
FIG. 2 is a diagram illustrating a method for controlling the receiving device according to the first embodiment of the present invention.

Next, the operation of the receiving device will be described with reference to FIGS. 1 and 2. FIG. 2 is an illustration describing a method for controlling the receiving device of FIG. 1. In FIG. 2, the abscissa indicates a moving distance (which will be herein referred to as a "time point t") in the case where a communication system is assumed to be moving at a constant speed, and the ordinate indicates the reception electric field intensity of a received signal at a time point t. Also, in FIG. 2, s1 is a demodulation signal output by the demodulator circuit 2 of FIG. 1, s2 is a signal (power supply voltage) supplied to the receiver circuit 1 by the operation control circuit 4, s3 is a signal (power supply voltage) supplied to the demodulator circuit 2 by the operation control circuit 4, and s4 is a reception electric field intensity signal 25 output to the comparator circuit 3 by the receiver circuit 1. In FIG. 2, for simplification, a reception filed intensity signal 25 when the receiving device (moving station) of this embodiment approaches a base station. Hereinafter, the case where the level of the reception electric field intensity signal 25 is increased in proportion to time in this embodiment will be described. A reception electric field intensity signal fluctuates not linearly but up and down. Note that this embodiment is nothing more than an example of the present invention and may be applied to a reception electric field intensity signal in some other form.

Moreover, as shown in FIG. 2, in the demodulation signal s1, the signal segment 20 is part in which information to a mobile station (i.e., a target reception device) is contained and the signal segment 21 is part in which information to the mobile station is not contained. Needless to say, the demodulation signal output s1 is not limited to the segments 20 and 21 of the demodulation signal.

In this embodiment, first, when the receiving device is far from a base station (before a time point t1), i.e., when it is judged by the comparator circuit 3 that a reception electric field intensity v is smaller than the second threshold 27 (continuous electric field intensity measurement start level v2), the receiver circuit 1 is turned ON/OFF at regular intervals in the signal segment 22 (intermittent reception segment) of FIG. 2. In this case, the comparator circuit 3 measures the reception electric field intensity v of a signal of a communication frequency while the receiver circuit 1 is ON (intermittent reception segment). That is, in the signal segment 22, the reception electric field intensity is intermittently measured. During the signal segment 22, power supply to the demodulator circuit 2 is stopped and also operations of the CPU 10 and the signal processing circuit 9 are stopped or the CPU 10 and the signal processing circuit 9 are operated at low speed by a clock.

Furthermore, when the receiving device approaches the base station, the reception electric field intensity v is increased with time (distance). Then, when the level of the reception filed intensity v exceeds the second threshold 27 (continuous electric field intensity measurement start level v2), at the time point t1, the comparator circuit 3 judges that the receiving device 1 approaches a communication area and continuously supplies power to the receiver circuit 1 as in the receiver circuit power ON segment 23. Thus, the receiving device 1 is changed from an intermittent reception state (intermittent reception segment, i.e., the signal segment 22) to a continuous reception state (continuous reception segment, i.e., the receiver circuit power ON segment 23) and continuously measures the reception electric field intensity v. At this point of time, power supply to the demodulator circuit 2 is not started and the signal processing circuit 9 for processing a demodulation signal is not operated. On the other hand, the CPU 10 is not operated or in a low-speed operation state.

Subsequently, when the receiving device further approaches the base station and the reception electric field intensity v exceeds the first threshold 26 (reception start level v1) at the time point t2, the comparator circuit 3 judges that the receiving device has entered a communication area. Thus, the power of the demodulator circuit 2 and the power of the signal processing circuit 9 are, then, turned ON by the operation control circuit 4, and the CPU 10 becomes in an operation state. Moreover, at this time point t2, the demodulator circuit 2 becomes in a power ON segment 24. Thus, the signal input from the antenna 7 to the demodulator circuit 2 via the receiver circuit 1 is output as the demodulation signal s1. Then, the demodulator signal s1 in the signal segment 20 is processed by the signal processing circuit 9.

In this embodiment, a value for the first threshold 26 is larger than the second threshold 27. Each of the first threshold 26 and the second threshold 27 is stored in the comparator circuit 3.

Figure 23:
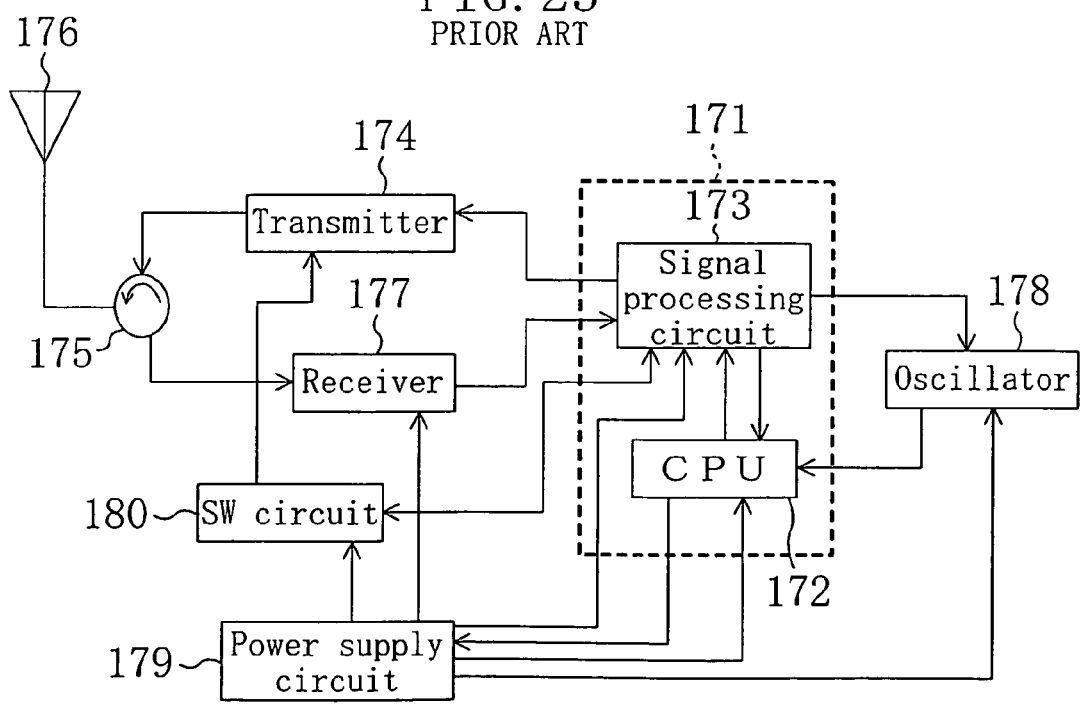
Figure 24:
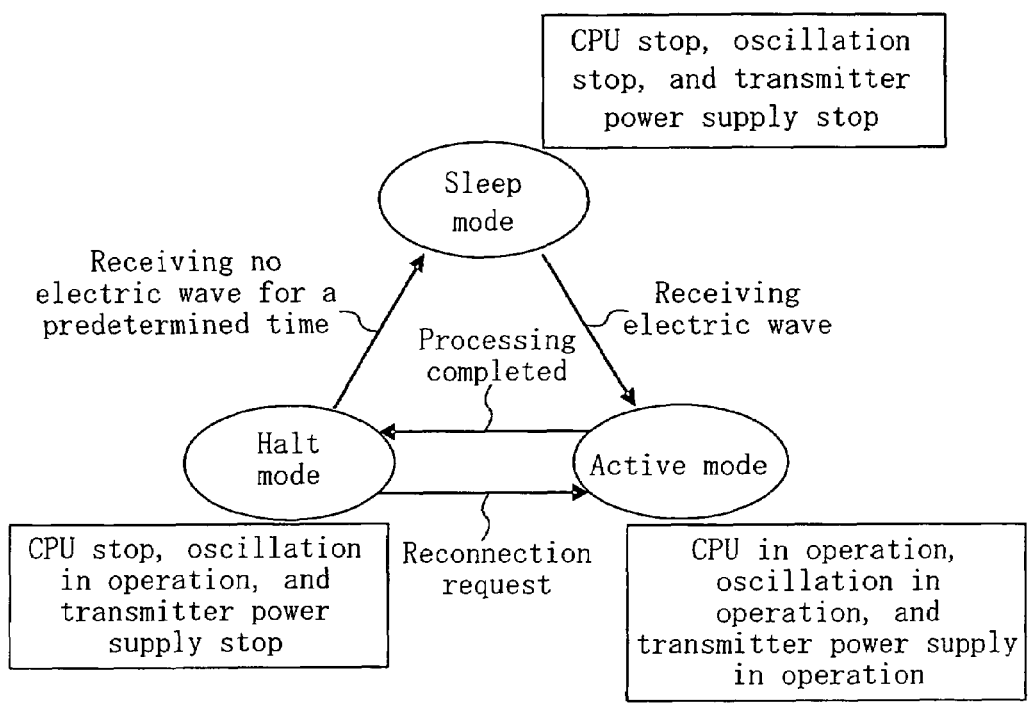
FIG. 24 is a diagram illustrating the operation of the known vehicle-mounted communication system.

With the receiving device of this embodiment, when the receiving device (moving station) is far from a base station, the receiver circuit 1 intermittently receives a signal and the power of the demodulator circuit 2 is turned OFF. Thus, compared to a known example shown in FIGS. 23 and 24, power consumption can be reduced in the receiver circuit 1 and the demodulator circuit 2. That is, power consumption of the receiving device in a standby status, for example, when the receiving device is out of a communication area of a base station can be reduced. Therefore, the receiving device of this embodiment can be preferably used not only in a vehicle-mounted communication system using a dedicated short range communication system or a wireless LAN system but also a portable transmitting/receiving device of which power consumption is required to be reduced.

Specifically, a vehicle-mounted transmitting/receiving device such as an ETC system takes power directly from a car body (battery) in a conventional manner. Thus, power can be supplied to the vehicle-mounted transmitting/receiving device at all the time and there has been no need to reduce power consumption. However, conventionally, there have been cases where a temperature in a car sometimes becomes higher than room temperature and, if the power of the transmitting/receiving device is ON at all the time in such an environment, the temperature of the transmitting/receiving device is increased to a high temperature. According to the present invention, however, with reduction in power consumption, heating of the transmitting/receiving device can be suppressed and the effect of improving heat resistant reliability of the transmitting/receiving device can be achieved.

Moreover, a threshold (the second threshold 27) for turning ON the receiver circuit 1 is set at a different value from a value for a threshold (the first threshold 26) for turning ON the demodulator circuit 2. Thus, the power of the receiver circuit 1 can be turned ON prior to the demodulator circuit 2, the receiving device can be speedily started up when the receiving device approaches a communication area and the receiving device can start communication with the base station. Accordingly, for example, if the receiving device of this embodiment is used in a transmitting/receiving device for an ETC system, the receiving device is operated without delay before a tollgate. Therefore, when a car approaches a tollgate, start of receiving a signal is delayed can be prevented and, therefore, an accident such as a crash of the car into an open/close bar of the tollgate.

With use of a digital circuit for the receiver circuit 1 or the demodulator circuit 2, even if a clock signal is controlled, instead of power supply source, the same effect can be achieved, so that power consumption can be reduced. In such a case, instead of the operation control circuit 4 for controlling power supply, an operation control circuit for controlling clock supply to the receiver circuit 1, the demodulator circuit 2, the signal processing circuit 9 and the CPU 10 is provided.

The receiving device of this embodiment or a transport apparatus (such as an ETC system-mounted vehicle) in which the receiving device of this embodiment is mounted may include a notifying section for issuing warning by a sound or a color when the reception electric field intensity v exceeds the second threshold 27. For example, when a sound is used for warning, music, a beeper or anything making a sound can be used. When a color is used for warning, light emitting diode, a lamp or anything having a display function may be used. Thus, a failure of placing an external component such as an ETC card necessary for communication operation with a base station can be prevented before a vehicle enters a tollgate.

Also, even if a CPU, instead of the judging circuit 8, is used, the same function as that of the receiving device of FIG. 1 can be achieved.

Hereinafter, a setting standard for each of the first and the second thresholds described above will be described.

The first threshold level:

The standard sensitivity of an ETC (ASK) defined by the 3. 4. 3. 2 reception sensitivity of an ARIB STD-T75 receiver is −60 dBm. When a signal of −60 dBm or more is input, the signal has to be properly received as a signal from a base station.

Also, as for no-response input standard, there is a rule of banning response to an electric wave of −70.5 dBme.i.r.p. or less. Accordingly, in assumption that an antenna of about 0 dBi is used, an allowable lower limit of the first threshold level is about −70 dBm for an input level.

Therefore, the first threshold level is set to be between the no-response input standard and the standard reception sensitivity. In this case, for example, the first threshold is in a range of −70 dBm or more and −60 dBm or less.

Second threshold level:

The second threshold level is preferably an upper limit value (−70 dBm) or less of the no-response input level defined by the above-described standard and is set to be in a range of about −100 dBm, i.e., the level of thermal noise in an antenna terminal of a receiver.

For example, as for a receiver with a noise figure is 10 dB, a noise level when no input is received is a level which is 10 dB larger than thermal noise. Thus, in this case, the second threshold is preferably set to be −90 dBm or more and −70 dBm or less. In this embodiment, the second threshold level is in a range of −90 dBm or more and −70 dBm or less.

Note that the settings for the first and second thresholds are applied to each of the following embodiments.

Second Embodiment

As a second embodiment of the present invention, a hysteresis control used in a receiving device according each embodiment of the present invention will be described.

Figure 3:
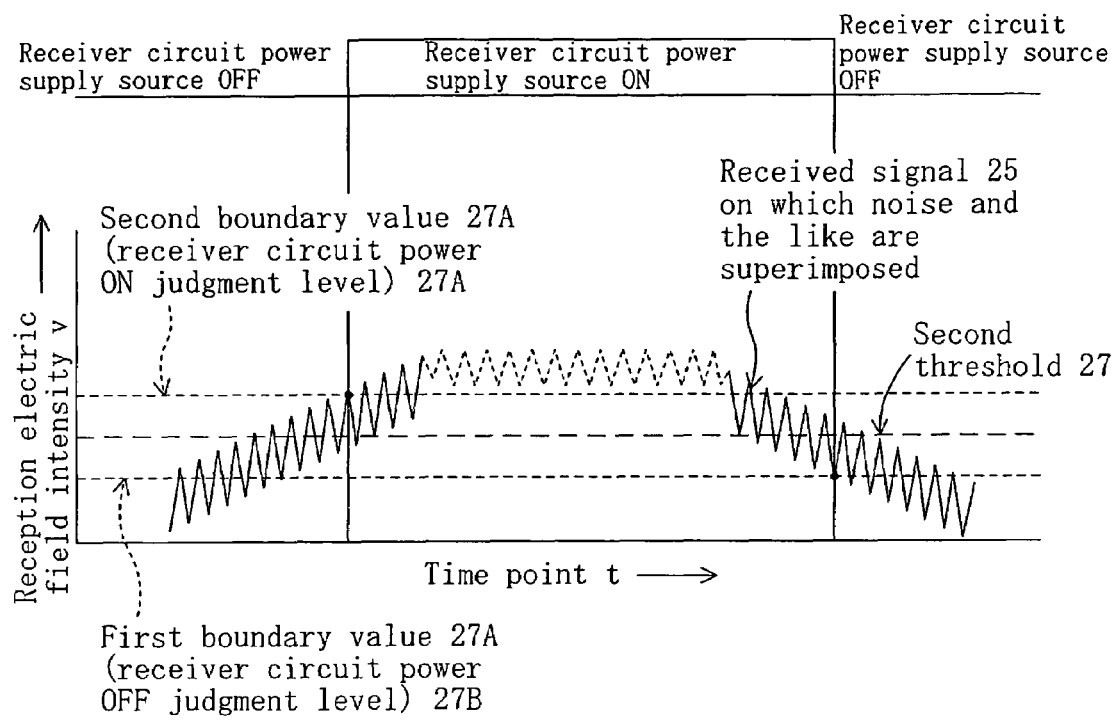
FIG. 3 is a diagram illustrating a method for judging a reception start level in a receiving device according to a second embodiment of the present invention.

FIG. 3 is a diagram illustrating a method for judging a reception start level v2 (second threshold 27) in a receiving device according to the second embodiment. As shown in FIG. 3, a signal received by the receiver circuit 1 contains noise and the like and the reception electric field intensity v of the received signal varies depending on a measuring time point. Thus, in the receiving device of FIG. 1, if the comparator circuit 3 judges the level of the reception electric field intensity signal 25 based on the second threshold of a single value, there might be cases where an accurate operation of the receiver circuit 1 can not be performed. That is, because of the influence of noise, there might be cases where with a threshold assumed as a boundary, the reception electric field intensity v fluctuates up and down and unintentional repetition of turning ON/OFF of the receiver circuit is caused.

To cope with the above-described problem as shown in FIG. 3, a receiver circuit power ON judgment level (second boundary value 27A) which is higher than the second threshold 27 and a receiver circuit power OFF judgment level (first boundary value 27B) which is lower than the second threshold are stored in the comparator circuit 3, and the level of the reception electric field intensity signal 25 is judged with the receiver circuit power ON judgment level and the receiver circuit power OFF judgment level assumed to be the second threshold 27. Specifically, when the level of the reception electric field intensity signal 25 exceeds the second boundary value 27A, the power of the receiver circuit 1 is turned ON, and when the level of the reception electric field intensity signal 25 becomes equal to or lower than first boundary value 27B, power supply (or clock supply in the case of a digital circuit) to the receiver circuit 1 is stopped.

If a difference between the second boundary value 27A and the first boundary value 27B is properly set according to an oscillation width of a received signal, a judgment error can be prevented in the above-described manner. Note that in the same manner, a demodulator circuit power ON judgment level and a demodulator circuit power OFF judgment level can be set for the first threshold 26 and an operation of the demodulator circuit 2 can be started without causing errors.

As has been described, in the control method of this embodiment, to prevent an operation error of the receiver circuit and the like, effects of noise contained in an electric intensity signal of a received signal are removed using the first boundary value and the second boundary value. The second boundary value is larger than the first boundary value and can be the same value as the second threshold value. Moreover, it is preferable that the first boundary value is set to be equal to or lower than a value obtained by subtracting, from the second threshold, a maximum value of amplitude of a reception electric filed intensity containing noise. For example, the first boundary value is preferably set to be a value in the range from the second threshold to 6 dB or less. However, if a noise signal level when the receiving device receives no signal is −90 dBm, the first boundary value is set to be a value which can be distinguished to be larger than thermal noise. For example, the first boundary value is preferably set to be between a 6 dB lower than the second threshold and −90 dBm.

Third Embodiment

Hereinafter, a receiving device according to a third embodiment of the present invention will be described with reference to FIG. 4. Note that detail also described in the first embodiment and the detail description of each member also shown in FIG. 1 will be omitted.

Figure 4:
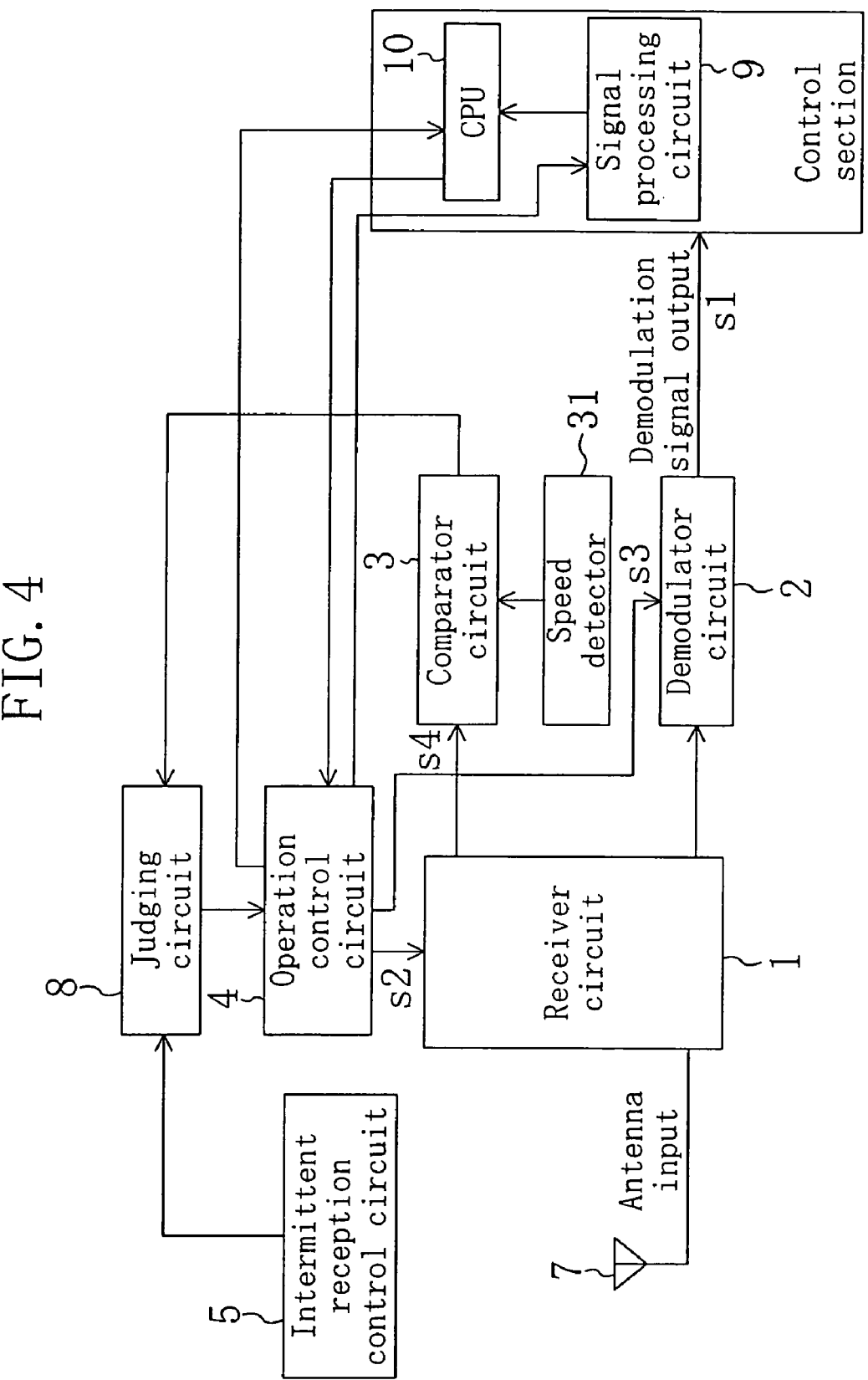
FIG. 4 is a block diagram illustrating the configuration of a receiving device according to a third embodiment of the present invention.

FIG. 4 is a block diagram illustrating the configuration of the receiving device of the third embodiment of the present invention. As shown in FIG. 4, the receiving device of this embodiment includes a receiver circuit 1 for outputting a signal received via an antenna 7 as a reception filed intensity signal, a demodulator circuit 2 for demodulating the signal processed by the receiver circuit 1 and outputting the signal, a comparator circuit 3 for comparing the level of the reception electric field intensity signal output from the receiver circuit 1 with a first threshold and a second threshold and judging the level of the reception electric field intensity signal, an intermittent reception control circuit 5 for outputting a signal (intermittent cycle signal) for intermittently measuring the reception electric field intensity signal, and an operation control circuit 4 for controlling supply of power supply voltage to the receiver circuit 1 and the demodulator circuit 2. Moreover, the receiving device of this embodiment further includes a judging circuit 8 for judging a method for controlling the operation control circuit 4 according to a judgment result of the comparator circuit 3, a signal processing circuit 9 and a CPU 10 each for processing a demodulation signal output from the demodulator circuit 2, and a speed detector 31 for detecting a moving speed of the receiving device and outputting a detection result to the comparator circuit 3. As described above, the receiving device of this embodiment has a configuration in which the speed detector 31 for detecting a moving speed of the receiving device, i.e., a mobile station is further provided in the receiving device of the first embodiment.

Figure 5:
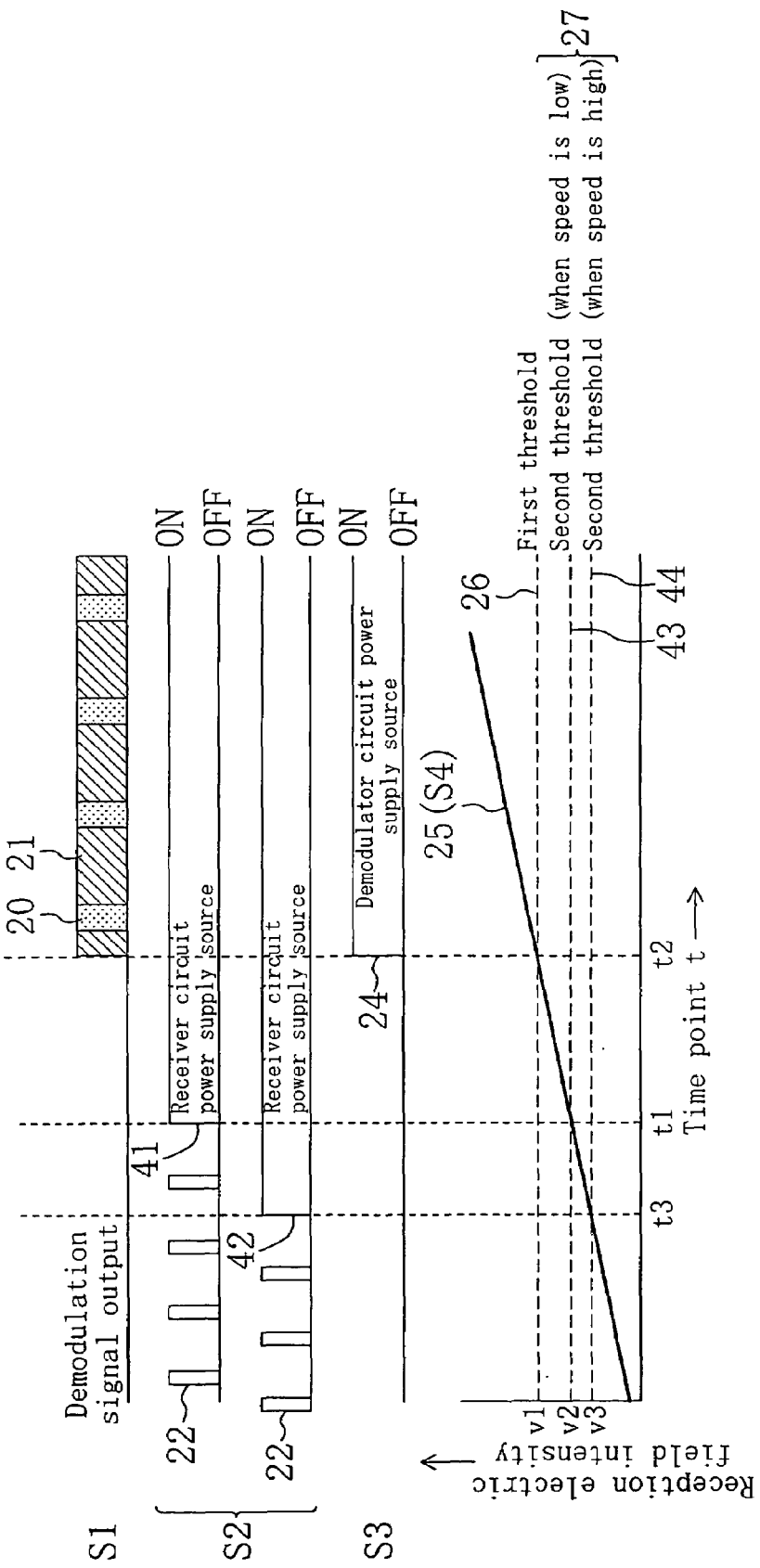
FIG. 5 is a diagram illustrating a method for controlling the receiving device according to the third embodiment of the present invention.

The operation of the receiving device will be described with reference to FIGS. 4 and 5. FIG. 5 is a diagram illustrating a method for controlling the receiving device of FIG. 4. In FIG. 5, a signal segment 20 of a demodulation signal output is part in which information to a moving station and a signal segment 21 of the demodulation signal is part in which information to the moving station is not contained. Also, in FIG. 5, s1 is a demodulation signal output by the demodulator circuit 2 of FIG. 1, s2 is a signal (power supply voltage) supplied to the receiver circuit 1 by the operation control circuit 4, and s3 is a signal (power supply voltage) supplied to the demodulator circuit 2 by the operation control circuit 4. Also, in FIG. 5, s4 is the reception electric field intensity signal 25 output to the comparator circuit 3 by the receiver circuit 1.

As will be described below, the receiving device of this embodiment is characterized in that the second threshold 27 shown in the first embodiment is changed depending on the moving speed of the receiving device detected by the speed detector 31. In FIG. 5, an example in which for the second threshold 27, a second threshold 43 is set in the case where the moving speed of the receiving device is low and a second threshold 44 is set in the case where the moving speed of the receiving device is high is shown. In this case, the second threshold 43 (second threshold level v2) is higher than the second threshold 44 (second threshold level v3).

First, when the receiving device approaches a base station from the outside of a communication area of the base station, as the intermittent reception segment (signal segment 22) of FIG. 5 shows, the intermittent reception control circuit 5 periodically outputs an intermittent cycle signal for turning ON/OFF the power of the receiver circuit 1 and the receiver circuit 1 is controlled by the operation control circuit 4. At this time, the comparator circuit 3 measures a reception filed intensity v of a signal of a communication frequency while the receiver circuit 1 is in an ON state. Moreover, as the receiving device approaches the base station, the reception electric field intensity signal v is increased. For example, the level of a reception electric field intensity signal is changed as the reception electric field intensity signal 25 of FIG. 5.

In this case, if the speed detector 31 measures the moving speed of the receiving device and the obtained moving speed is a certain speed or more, according to the measurement result, the second threshold 27 stored in the comparator circuit 3 is lowered and the second threshold 44 is used. If the obtained moving speed is the certain speed or less, the second threshold 27 stored in the comparator circuit 3 is increased and the second threshold 43 is used.

In this case, the speed described above is, in general, a speed at which a vehicle can safely travel under a regulation speed outside of a communication area. For example, if the vehicle is on a highway, the speed is set to be 80 km or less.

Accordingly, when the moving speed is high and the reception electric field intensity v exceeds the second threshold level v3 at a time point t3 which is earlier than a time point t1, the receiver circuit 1 is turned to be in a receiver circuit power ON segment (continuous reception segment) 42, i.e., a continuous reception state, from the intermittent reception state (intermittent reception segment, i.e., signal segment 22).

On the other hand, when the moving speed is low and the reception electric field intensity v exceeds the second threshold level v2 at the time point t1, the receiver circuit 1 is turned to be in the receiver circuit power ON segment (continuous reception segment) 41, i.e., a continuous reception state, from the intermittent reception state (intermittent reception segment, i.e., signal segment 22), and continuously measures the reception electric field intensity v. Note that at this point of time, power supply to the demodulator circuit 2 is not started and the signal processing circuit 9 and the CPU (processing unit) 10 each for processing a demodulation signal are not operated.

Subsequently, at a time point t2, when the reception electric field intensity v exceeds the first threshold level v1, based on an output of a judgment result of the comparator circuit 3, the judging circuit 8 judges that the receiving device has entered the communication area. According to the judgment result of the judging circuit 8, the operation control circuit 4 starts supply of power supply voltage to the demodulator circuit 2 and is turned to be in a demodulator circuit power ON segment 24. Accordingly, the received signal input into the demodulator circuit 2 from the antenna 7 via the receiver circuit 1 is output as a demodulation signal s1. Then, the demodulation signal s1 is processed by the signal processing circuit 9 and the CPU 10.

In the known receiving device, if the moving speed of the receiving device is high, the receiving device might travel a long distance during a sleep mode and a start of receiving a signal might be delayed. In contrast, in the receiving device of this embodiment, if the moving speed of the receiving device is increased, the power of the receiver circuit 1 is turned ON at an earlier time. Thus, switching from the intermittent reception segment 22 to the continuous reception segment (the receiver circuit power ON segment 42) can be stably performed. Therefore, delay in a start of an operation of the receiver circuit 1 can be prevented. Moreover, the receiver circuit 1 performs intermittent reception, thus reducing the amount of current to be consumed when the receiving device is outside of a communication area and in a standby status.

When a digital circuit is used for the receiver circuit 1 or the demodulator circuit 2, even if a clock signal is controlled, instead of power supply source, the same effect can be achieved, so that power consumption can be reduced.

In this embodiment, the case where the first threshold is higher than the second threshold has been described. However, as long as the reception electric field intensity signal is changed according to each time point for the receiving device, the first threshold and the second threshold may be set in a different manner. In such a case, when the moving speed of the receiving device is high, the first threshold and the second threshold are changed so that a difference between the first threshold and the second threshold becomes larger.

As described above, with the receiving device of this embodiment, the electric field intensity measurement start level (second threshold) is changed according to the moving speed of the receiving device. Thus, the power of the receiver circuit can be turned ON at a proper time without delay.

Note that in this embodiment, the moving speed of the receiving device may be judged, for example, based on increase and decrease in acceleration of the receiving device. Specifically, assume that a receiving device is traveling at a certain speed. If it is found that a moving speed of the receiving device is increased, a threshold is reduced. If it is found that a moving speed of the receiving device is reduced, a threshold is increased. In this manner, even if a device for measuring the moving speed of the receiving device is not installed to an axle shaft or the like, an acceleration sensor is used to obtain the moving speed of the receiving device. Therefore, an interconnect becomes unnecessary and a speed of a ship or the like, which do not include an axis shaft can be measured.

Fourth Embodiment

Figure 6:
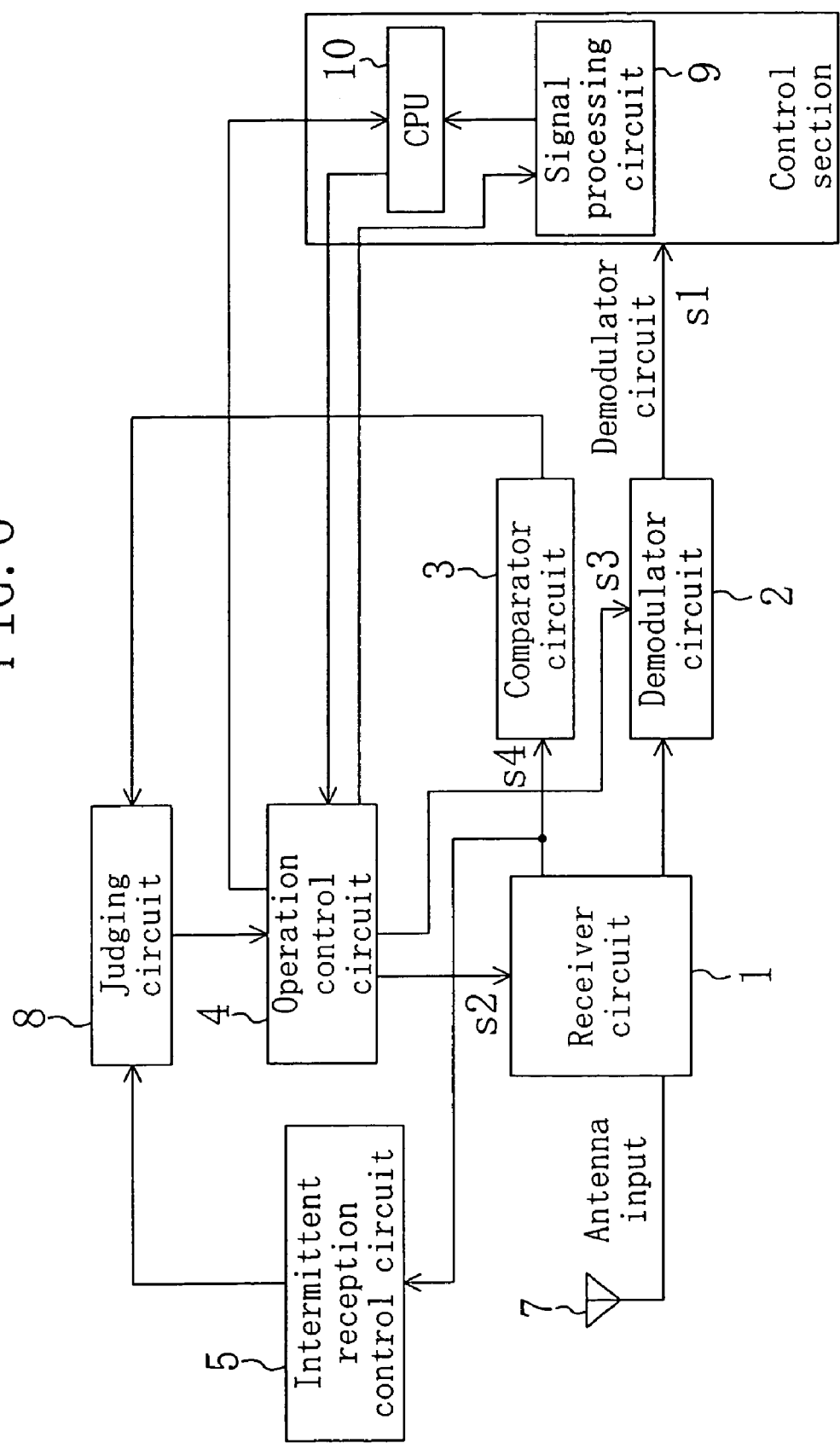
FIG. 6 is a block diagram illustrating the configuration of a receiving device according to a fourth embodiment of the present invention.

FIG. 6 is a block diagram illustrating a receiving device according to a fourth embodiment of the present invention. As shown in FIG. 6, the receiving device of this embodiment includes a receiver circuit 1 for outputting a signal received via an antenna 7 as a reception electric field intensity signal, a demodulator circuit 2 for demodulating the signal processed by the receiver circuit 1 and outputting the signal, and a comparator circuit 3 for comparing the level of the reception electric field intensity signal output from the receiver circuit 1 with a first threshold and a second threshold. Moreover, the receiving device of this embodiment further includes an intermittent reception control circuit 5 for outputting a signal for intermittently measuring the reception electric field intensity signal and changing a measuring cycle according to the intensity of the reception electric field intensity signal, an operation control circuit 4 for controlling supply of power supply voltage to the receiver circuit 1 and the demodulator circuit 2, a judging circuit 8 for changing control of the operation control circuit 4 according to a judgment result of the comparator circuit 3, a signal processing circuit 9 and a CPU 10 each for processing a demodulation signal output from the demodulator circuit 2.

Unlike the receiving device of the first embodiment, the receiving device of this embodiment is characterized in that an intermittent cycle in an intermittent cycle signal output from the intermittent reception control circuit 5 can be set according to a reception electric field intensity signal.

Figure 7:
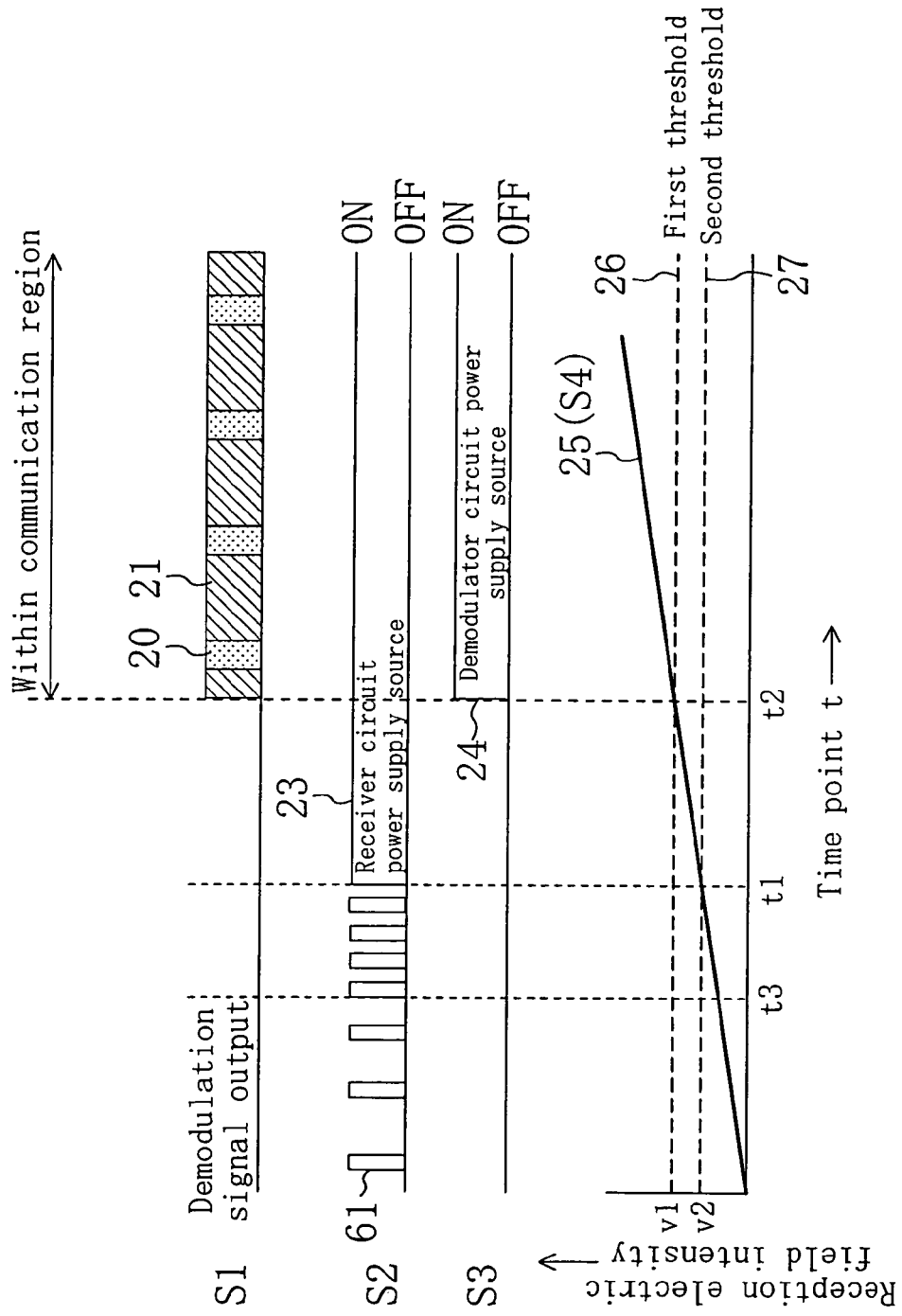
FIG. 7 is a diagram illustrating a method for controlling the receiving device according to the fourth embodiment of the present invention.

The operation of the receiving device of this embodiment will be described with reference to FIGS. 6 and 7. FIG. 7 is a diagram illustrating a method for controlling the receiving device of FIG. 6. Note that the description of each member also shown in FIG. 2 and detail also described in the first embodiment will be omitted.

In the receiving device of this embodiment, when the receiving device is outside of a communication area and the level of the reception electric field intensity signal 25 is equal to or lower than the second threshold 27, the intermittent reception control circuit 5 changes a cycle of turning ON/OFF of the power of the receiver circuit 1 according to the level of the reception electric field intensity signal 25 output from the receiver circuit 1. Specifically, the intermittent control circuit 5 outputs a signal s2 for turning ON/OFF the power of the receiver circuit 1 at shortened intervals as the level of the reception electric field intensity signal 25 is increased to a certain extent and becomes closer to the second threshold level v2. Accordingly, when the level of the reception electric field intensity signal 25 becomes high, it is judged that the receiving device approaches a base station and the cycle of intermittent reception of the reception electric field intensity is shortened. Thus, delay in a start of reception electric field intensity measurement (start of turning ON the power of the receiver circuit 1) can be prevented.

As for judgment of the level of the reception electric field intensity signal 25 is performed in the following manner. For example, another judging circuit for judging a reception electric field intensity is provided. Then, in the judging circuit, a reception electric field intensity level which is lower than the second threshold 27 is set to be a desired level and whether or not the level of the reception electric field intensity signal s4 output from the receiver circuit 1 exceeds the desired level is judged. Note that it is another option that a judgment circuit of any other electric field intensity is not provided and a desired level, in addition to the first and second threshold levels, is stored in the comparator circuit 3.

In this case, for example, as in the first embodiment, if the second threshold level v2 is set to be −90 dBm or more and −70 dBm or less, the desired level may be set to be in a range from a value of 6 dB or more smaller than v2 to a thermal noise level of the receiving device.

Thereafter, an operation of the receiving device is performed in the same manner as in the first embodiment. Specifically, when the receiving device approaches the communication area and the level of the reception field intensity signal exceeds the second threshold 27 (continuous reception electric field intensity measurement start level v2) at the time point t1, the comparator circuit 3 judges that the receiving device approaches the communication area and the receiving device is turned to be in a receiver circuit power ON segment 23, i.e., a continuous reception state, from an intermittent reception state (intermittent reception segment 61) and power supply voltage is supplied to the receiver circuit 1. Thus, the reception electric field intensity v is continuously measured. Note that at this time point, power supply to the demodulator circuit 2 is not started and the signal processing circuit 9 and the CPU 10 each for processing a demodulation signal s1 are not operated.

Subsequently, when the reception electric field intensity signal 25 exceeds the first threshold (communication start level v1) 26 at the time point t2, the comparator circuit 3 judges that the receiving device has entered the communication area, the power of the demodulator circuit 2 is turned ON and the demodulator circuit 2 becomes in a demodulator circuit power ON segment 24. Thus, the received signal input from the antenna 7 to the demodulator circuit 2 via the receiver circuit 1 is output as a demodulation signal s1. The demodulation signal s1 is processed by the signal processing circuit 9 and then output to the CPU 10. Note that in this method, the first threshold 26 is higher than the second threshold 27 and each of the first threshold 26 and the second threshold 27 is stored in the comparator circuit 3.

As described above, in the receiving device of this embodiment, the cycle of intermittent reception in the receiver circuit 1 can be changed according to the level of the reception electric field intensity v of a received signal. Thus, delay in a start of reception can be reduced and also the amount of electric current to be consumed in a standby status when the receiving device is outside of a communication area can be reduced.

Fifth Embodiment

Figure 8:
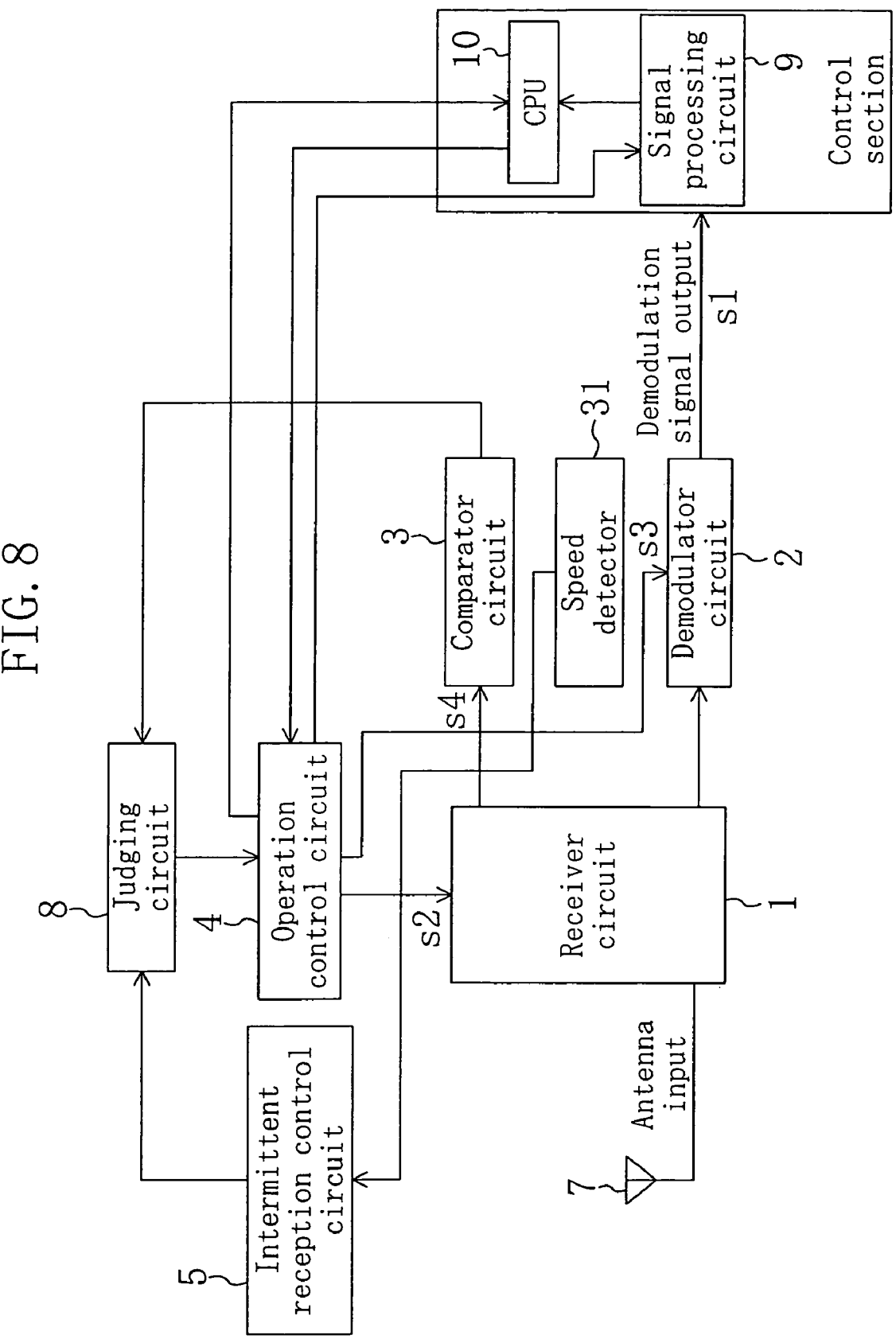
FIG. 8 is a block diagram illustrating the configuration of a receiving device according to a fifth embodiment of the present invention.

FIG. 8 is a block diagram illustrating a receiving device according to a fifth embodiment of the present invention. As shown in FIG. 8, the receiving device of this embodiment includes a receiver circuit 1 for outputting a signal received via an antenna 7 as a reception electric field intensity signal s4 and a demodulator circuit 2 for demodulating the signal processed by the receiver circuit 1 and outputting the signal. Moreover, the receiving device of this embodiment further includes a comparator circuit 3 for comparing the level of a reception electric field intensity signal output from the receiver circuit 1 with a first threshold and a second threshold and judging the reception electric field intensity signal and an intermittent reception control circuit 5 for outputting a signal for intermittently measuring the reception electric field intensity signal. Furthermore, the receiving device of this embodiment includes an operation control circuit 4 for controlling supply of power supply voltage to the receiver circuit 1 and the demodulator circuit 2 and a judging circuit 8 for changing control of the operation control circuit 4 according to a comparison result by the comparator circuit 3. The receiving device of this embodiment also includes a signal processing circuit 9 and a CPU 10 each for processing a demodulation signal s1 output from the demodulator circuit 2, and a speed detector 31 for detecting a moving speed of the receiving device and outputting a detection result to the intermittent reception control circuit 5.

Unlike the receiving device of the fourth embodiment, the receiving device of this embodiment is characterized in that an intermittent cycle in an intermittent cycle signal output from the intermittent reception control circuit 5 can be set according to the moving speed of the receiving device.

Figure 9:
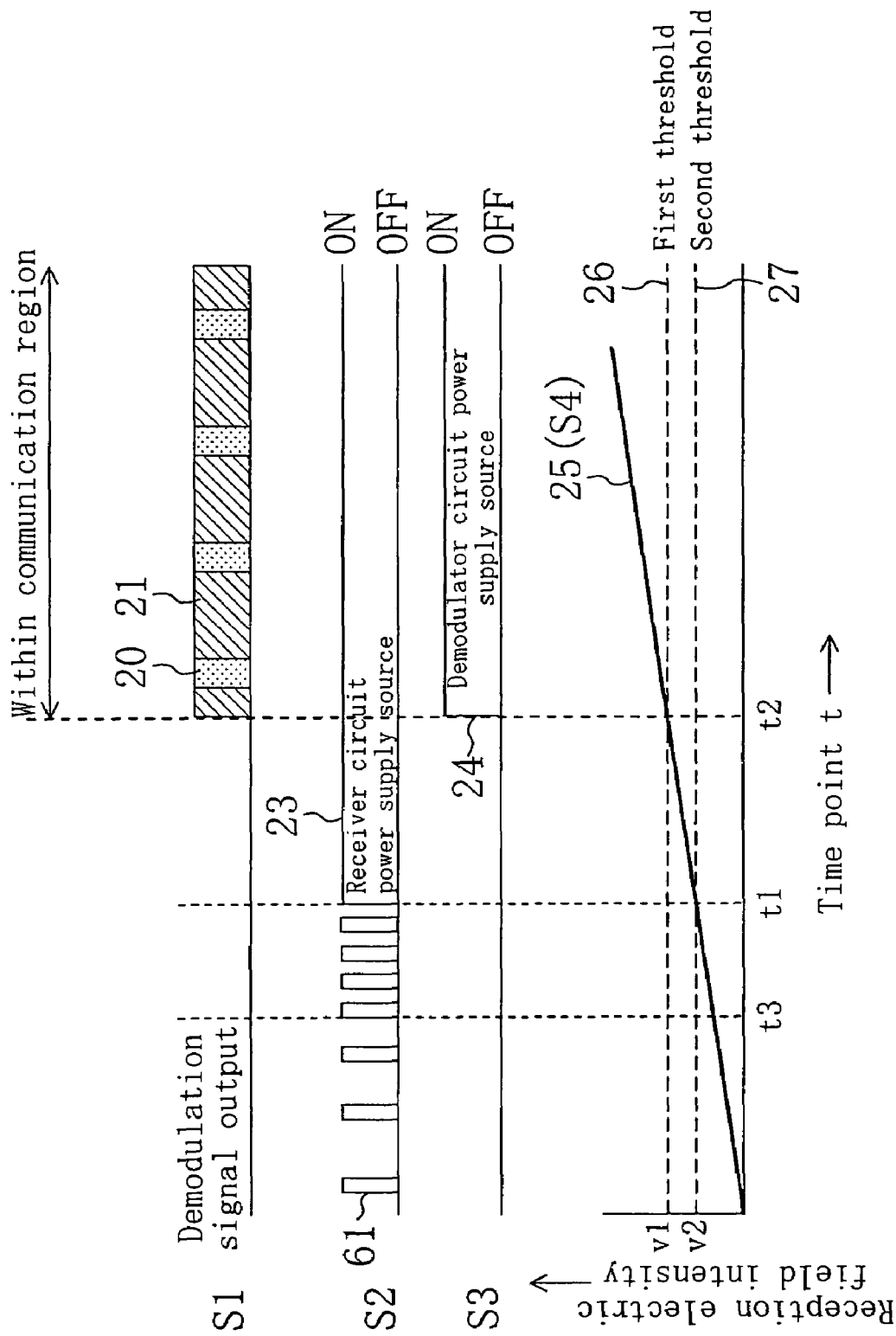
FIG. 9 is a diagram illustrating a method for controlling the receiving device according to the fifth embodiment of the present invention.

Next, the operation of the receiving device of this embodiment will be described with reference to FIGS. 8 and 9. FIG. 9 is a diagram illustrating a method for controlling the receiving device of FIG. 8. Note that the description of each member also shown in FIG. 7 and detail also described in the fourth embodiment will be omitted.

As shown in FIG. 9, when the receiving device is outside of a communication area and also the reception electric field intensity signal 25 is the second threshold level v2 or less, the intermittent reception control circuit 5 outputs an intermittent cycle signal so that the receiver circuit 1 is repeatedly turned ON/OFF in an intermittent manner. In this case, the intermittent reception control circuit 5 changes a cycle of turning ON/OFF of the receiver circuit 1 according to the level of a speed signal output from the speed detector 31.

Specifically, when the detected moving speed of the receiving device is low (for example, before a time point t3), the operation control circuit 4 outputs a signal s2 for turning ON/OFF of the receiver circuit 1 at longer intervals. Also, when the detected moving speed of the receiving device is high, the operation control circuit 4 outputs a signal s2 for turning ON/OFF of the receiver circuit 1 at shorter intervals. Thereafter, the operation of the receiving device of this embodiment is performed in the same manner as in the first embodiment and therefore the description thereof will be omitted.

In this case, for example, when it is judged that the moving speed of the moving device at the time point t3 is larger than a preset moving speed for the receiving device, the intermittent reception control circuit 5 outputs the signal s2 with a shorter intermittent cycle. Note that the preset moving speed is, for example, a regulation speed.

As described above, in the receiving device of this embodiment, when the moving speed of the receiving device is low, the cycle of intermittent reception of the receiver circuit is lengthened, so that power consumption can be reduced by the receiver circuit. On the other hand, when the moving speed of the receiving device is high, the cycle of intermittent reception of the receiver circuit is shortened, so that delay in a start of receiving a signal (receiver circuit power ON state) can be reduced.

According to the receiving method of the third embodiment, the second threshold is reduced to shift the receiving device to a continuous reception state at the time point t3 when the moving speed is increased. However, in the receiving method of this embodiment, unlike the third embodiment, an intermittent cycle in an intermittent reception state is shortened at the time point t3 when the moving speed is reduced.

Sixth Embodiment

Figure 10:
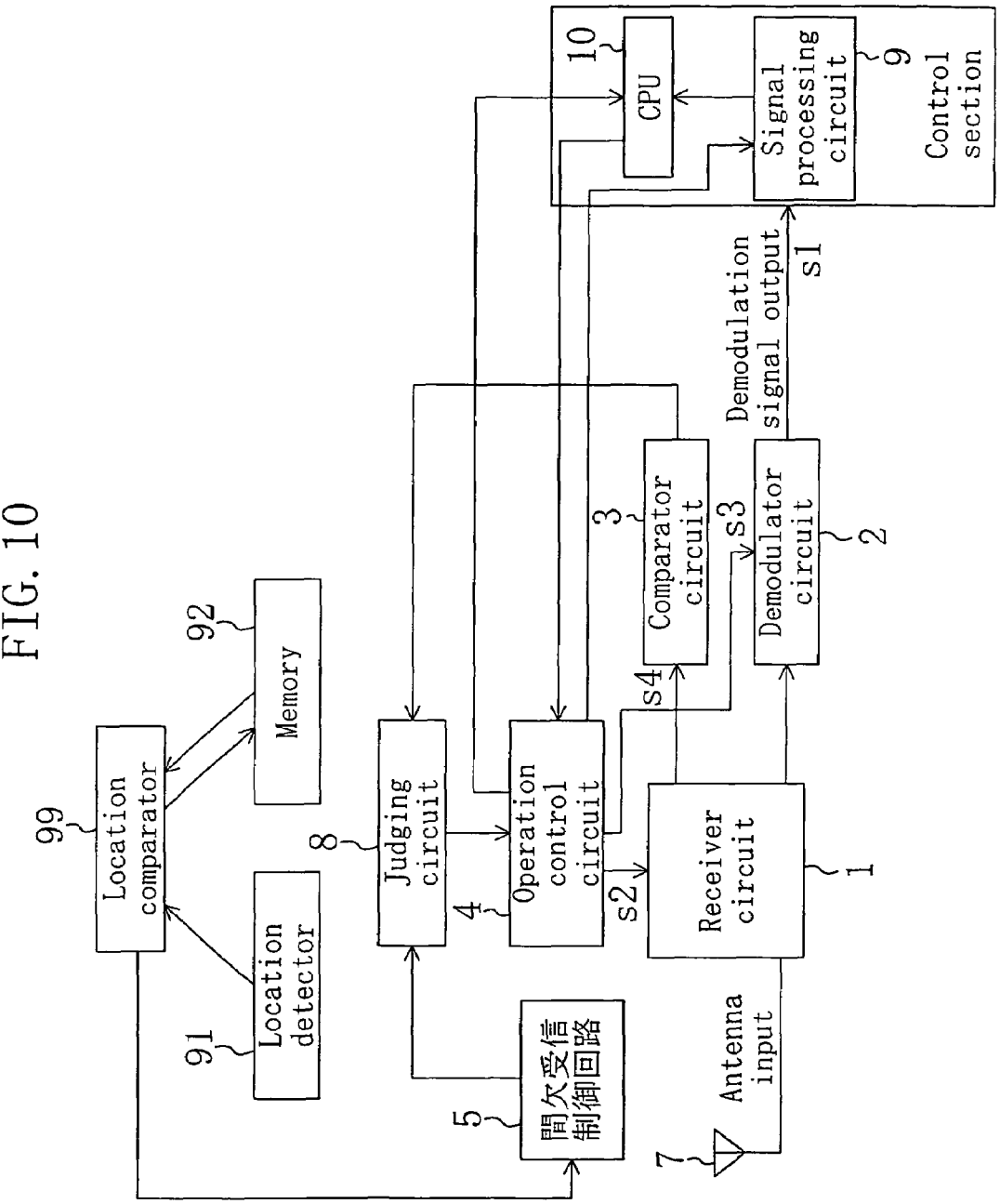
FIG. 10 is a block diagram illustrating the configuration of a receiving device according to a sixth embodiment of the present invention.

FIG. 10 is a block diagram illustrating the configuration of a receiving device according to a sixth embodiment of the present invention. As shown in FIG. 10, the receiving device of this embodiment includes a receiver circuit 1 for outputting a signal received via an antenna 7 as a reception electric filed intensity signal, a demodulator circuit 2 for demodulating the signal processed by the receiver circuit 1 and outputting the signal, and a comparator circuit 3 for comparing the level of the reception electric field intensity signal output from the receiver circuit 1 with a first threshold and a second threshold and judging the level of the reception electric field intensity signal. The receiving device of this embodiment further includes an intermittent reception control circuit 5 for outputting a signal for intermittently measuring the reception electric field intensity signal, and an operation control circuit 4 for controlling supply of power supply voltage to the receiver circuit 1 and the demodulator circuit 2, a judging circuit 8 for changing control of the operation control circuit 4 according to a judgment result of the comparator circuit 3, a signal processing circuit 9 and a CPU 10 each for processing a demodulation signal output from the demodulator circuit 2. Furthermore, the receiving device of this embodiment includes a location detector 91 for measuring a location of the receiving device, a memory 92 for storing a location of a base station, and a location comparator circuit 99 for comparing a measurement result of the location detector 91 with the location of the base station stored in the memory 92 and judging a distance between the receiving device and the base station. A judgment result of the location comparator circuit 99 is output to the intermittent reception control circuit 5.

Unlike the fifth embodiment, the receiving device of this embodiment is characterized in that the intermittent reception control circuit 5 outputs an intermittent cycle of intermittent reception of the receiving device according to the location of the receiving device with respect to a base station.

As the location detector 91, for example, a car navigation system using a GPS (global positioning system) can be used. Examples of the memory 92 are a car navigation system, a RAM (random access memory) and a hard disk.

Figure 11:
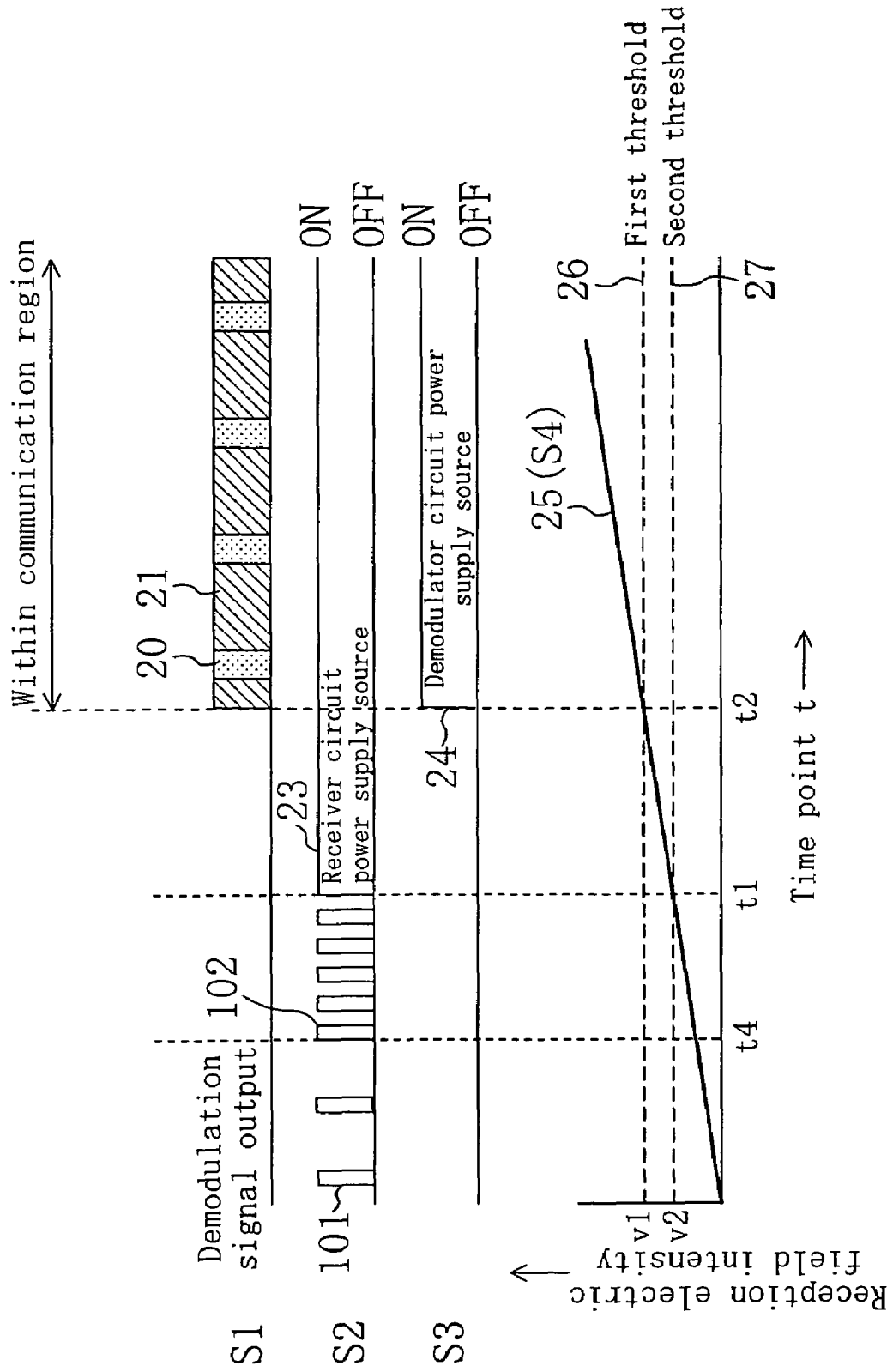
FIG. 11 is a diagram illustrating a method for controlling the receiving device according to the sixth embodiment of the present invention.

Next, the operation of the receiving device of this embodiment will be described with reference to FIGS. 10 and 11. FIG. 11 is a diagram illustrating a method for receiving a signal using the receiving device of FIG. 10.

As shown in FIG. 11, when the receiving device is outside of a communication area and the reception filed intensity signal 25 is the second threshold 27, the receiver circuit 1 performs intermittent reception, thereby measuring a reception electric field intensity v of a received signal. When measuring the electric field intensity, based on a judgment result of the location comparator circuit 99, different cycles of the intermittent reception are set for the case where the distance between the base station and the receiving device is larger than a predetermined value and the case where the distance between the base station and the receiving device is equal to or less than the predetermined value. Specifically, as shown in FIG. 11, when a distance to a base station is large (before a time point t4), i.e., when the distance between the base station and the receiving device is larger than a predetermined setting value, as an intermittent reception segment 101, an intermittent cycle is set to be relatively long. On the other hand, when the distance to the base station is small (from the time point t4 to a time point t1), i.e., when the distance between the base station and the receiving device is smaller than a predetermined setting value, as an intermittent reception segment 102, a cycle of intermittent reception is set to be short.

Subsequently, when the receiving device further approaches the base station and the reception electric field intensity signal 25 exceeds the second threshold level v2, the comparator circuit 3 judges that the receiving device approaches a communication area and the power of the receiver circuit 1 is turned ON by the operation control circuit 4. Thereafter, the operation of the receiving device is performed in the same manner as in the first embodiment.

As described above, the receiving device of this embodiment includes the memory 92 in which the location of an already known station has been previously stored. Thus, the distance between the receiving device and the base station can be precisely judged, so that power supply to the receiver circuit can be more efficiently started without delay. Furthermore, as in each of the above-described embodiments, power consumption in a reception standby status when the receiving device is outside of a communication area or the like can be reduced.

The receiving device of this embodiment is characterized in that intermittent reception control is performed based on location information of the base station stored in the memory 92. However, for a new base station of which information is not stored in the memory 92, when the new base station is found, the location of the base station is measured by the location detector 91 such as a GPS or the like and then stored in the memory 92, so that the location information can be used when the receiving device passes the base station next.

Seventh Embodiment

Figure 12:
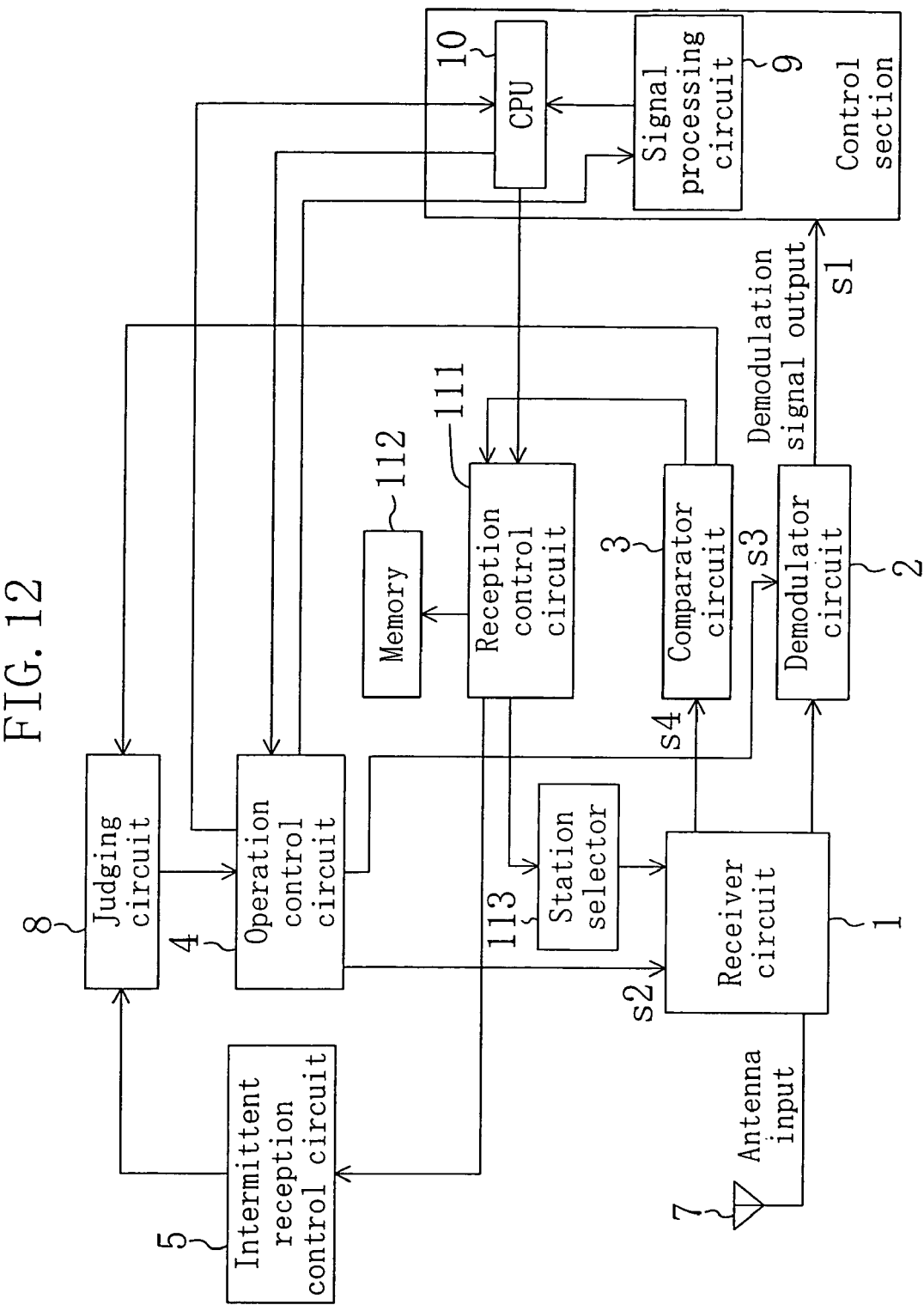
FIG. 12 is a block diagram illustrating the configuration of a receiving device according to a seventh embodiment of the present invention.

FIG. 12 is a block diagram illustrating the configuration of a receiving device according to a seventh embodiment of the present invention. Unlike the first embodiment, the receiving device of this embodiment is characterized in that the receiving device further includes a reception control circuit 111, a memory 112 and a selector 113 and is effective especially when a plurality of communication frequencies received from a base station exist. As shown in FIG. 12, the receiving device of this embodiment includes a receiver circuit 1 for outputting a signal received via an antenna 7 as a reception filed intensity signal s4, a demodulator circuit 2 for demodulating the signal processed by the receiver circuit 1 and outputting the signal, a comparator circuit 3 for comparing the level of the reception electric field intensity signal s4 output from the receiver circuit 1 with a first threshold, a second threshold and a third threshold and judging the level of the reception electric field intensity signal s4. Moreover, the receiving device of this embodiment further includes an intermittent reception control circuit 5 for outputting a signal for intermittently measuring the reception electric field intensity signal and an operation control circuit 4 for controlling supply of power supply voltage to the receiver circuit 1 and the demodulator circuit 2. Furthermore, the receiving device of this embodiment includes the selector 113 for selecting a communication frequency at which the receiver circuit 1 receives a signal when the power of the receiver circuit 1 is ON and the reception signal circuit 111 for selecting a plurality of communication frequencies in order using the selector 113 and making the comparator circuit 3 measure the reception electric field intensity of each of the plurality of communication frequencies. Also, the receiving device of this embodiment includes the memory 112 for storing a judgment result of the comparator circuit 3, a judging circuit 8 for changing control of the operation control circuit 4 according to the judgment result of the comparator circuit 3, a signal processing circuit 9 and a CPU 10 each for processing a demodulation signal s1 output from the demodulator circuit 2.

Figure 13:
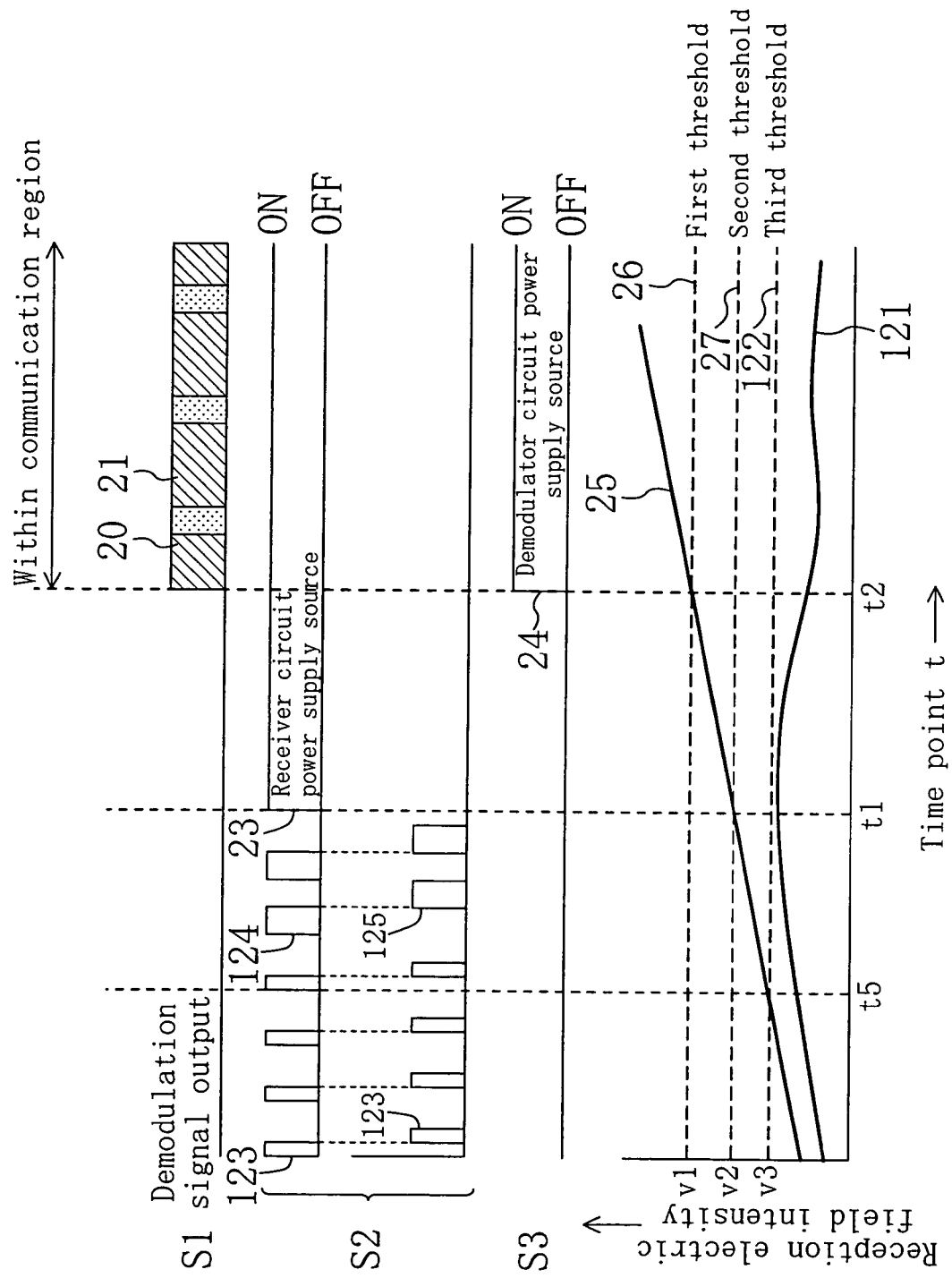
FIG. 13 is a diagram illustrating a method for controlling the receiving device according to the seventh embodiment of the present invention.

Next, the operation of the receiving device of this embodiment will be described with reference to FIGS. 12 and 13. FIG. 13 is a diagram illustrating a method for controlling the receiving device of FIG. 12.

The receiving device of this embodiment is used when a plurality of communication frequencies are transmitted from a base station. In this case, a signal segment 20 is part of a demodulation signal s1 of a selected communication frequency in which information to a mobile station is contained and a signal segment 21 is a part of the demodulation signal s1 of the selected communication frequency in which information to the mobile station is not contained. Moreover, in FIG. 13, reception electric field intensity signals 25 and 121 show change with time in reception field intensity v for two communication frequencies. In this case, a reception electric field intensity signal at a first communication frequency is assumed to be the reception electric field intensity signal 25 and a reception electric field intensity signal of a second communication frequency is assumed to be the reception electric field intensity signal 121. In FIG. 13, as for an illustration showing the signal s2, upper part shows an output signal to the receiver circuit 1 for receiving a first frequency signal and lower part shows an output signal to the receiver circuit 1 for receiving a signal of a second communication frequency.

When the receiving device approaches to a base station from the outside of a communication area of the base station and the reception electric field intensity v of a signal of the first communication frequency is equal to or higher than the second threshold 27, the intermittent reception control circuit 5 turns ON/OFF the power of the receiver circuit 1 at regular intervals. While the power of the receiver circuit 1 is ON, the selector 113 performs selection from the plurality of frequencies in order and the comparator circuit 3 measures the reception electric field intensity v of a signal of each communication frequency based on the selection of the selector 113. In this case, for example, if with the receiving device becoming closer to the base station, the reception electric field intensity of a signal of the first communication frequency is increased with time, as the reception electric field intensity signal 25 and the reception electric field intensity of a signal of the second communication frequency changes as the reception electric field intensity signal 121, the comparator circuit 3 judges whether or not the reception electric field intensity signal of one of the communication frequencies which has a higher electric field intensity v reaches the third threshold 122. If the reception electric field intensity signal of one of the communication frequencies which has a higher electric field intensity v is equal to or lower than the third threshold 122, intensity measurement is performed for the respective electric field intensity signals 25 and 121 of the first communication frequency and the second communication frequency at the same intervals for the same amount of time.

For example, if it is judged by the comparator circuit 3 that the reception electric field intensity v of a signal of the first communication frequency exceeds the third threshold level v3 at a time point t5, the reception control circuit 111 stores a judgment result in the memory 112. According to the threshold judgment result of the comparator circuit 3 stored in the memory 112, for the first communication frequency exceeding the third threshold level 122, sampling in which a time for measuring reception electric field intensity signal 25 is set to be a sufficient time for removing the effects of the second communication frequency signal is performed. For the second communication frequency, sampling is also performed in the same manner as that for the first communication frequency. The measuring time is changed for each of the communication frequencies in the intermittent reception segments 123 and 124 by the reception control circuit 111 outputting a control signal to the intermittent reception control circuit 5.

Next, when the reception electric field intensity signal 25 of the first communication frequency exceeds the second threshold level v2 at the time point t1, the comparator circuit 3 judges that the receiving device approaches a communication area and outputs a comparison result to the judging circuit 8 and the reception control circuit 111.

In response to the output, the reception control circuit 111 makes the selector 113 select a signal of the first communication frequency, based on the comparison result of the comparator circuit 3. The receiving device enters the receiver circuit power ON segment 23 from an intermittent reception state and continuously measures the reception electric field intensity signal 25.

Thereafter, when the reception electric field intensity signal 25 of the first communication frequency exceeds the first threshold level v1 at the time point t2, the comparator circuit 3 judges that the receiving device has entered a communication area and outputs a comparison result to the judging circuit 8. Then, independently from an output of the intermittent reception control circuit 5, the operation control circuit 4 supplies power supply voltage to the demodulator circuit 2 and the demodulator circuit power segment 24 begins. Thus, the signal input from the antenna 7 to the demodulator circuit 2 via the receiver circuit 1 is output as a demodulation signal s1 to the signal processing circuit 9.

With the receiving device of this embodiment, even when a plurality of communication frequencies exist in a short area communication such as dedicated short range communication and a wireless LAN communication, the best communication frequency can be selected. Also, in the receiving device of this embodiment, power consumption in a reception standby status when the receiving device is outside of a communication area is reduced and, when a received signal is judged to have a predetermined communication frequency, highly accurate measurement is performed over a long time, so that the power of the receiver circuit can be turned ON. Therefore, communication on a desired frequency can be started without delay when the receiver circuit enters a communication area. Moreover, it takes only a short time to perform measurement of the reception field intensities of signals of other frequencies than the desired communication frequency. Thus, power can be effectively reduced.

Assume that a digital circuit is used for the receiver circuit 1 or the demodulator circuit 2. Even when a clock signal is controlled, instead of power, the same effect can be achieved. Thus, a current to be consumed during a standby status can be reduced.

When the reception electric field intensity signal 25 of the first communication frequency exceeds the third threshold level v3 at the time point t5, for the second communication frequency, it may be only judged whether or not a signal of the second communication frequency has been received, or measurement may be performed in a segment 125 with a shorter measuring time (receiving time) than a measuring time for the first communication frequency. In such a case, power consumption can be reduced according to the amount of reduction in measuring time for the signal of the second communication frequency.

Figure 14:
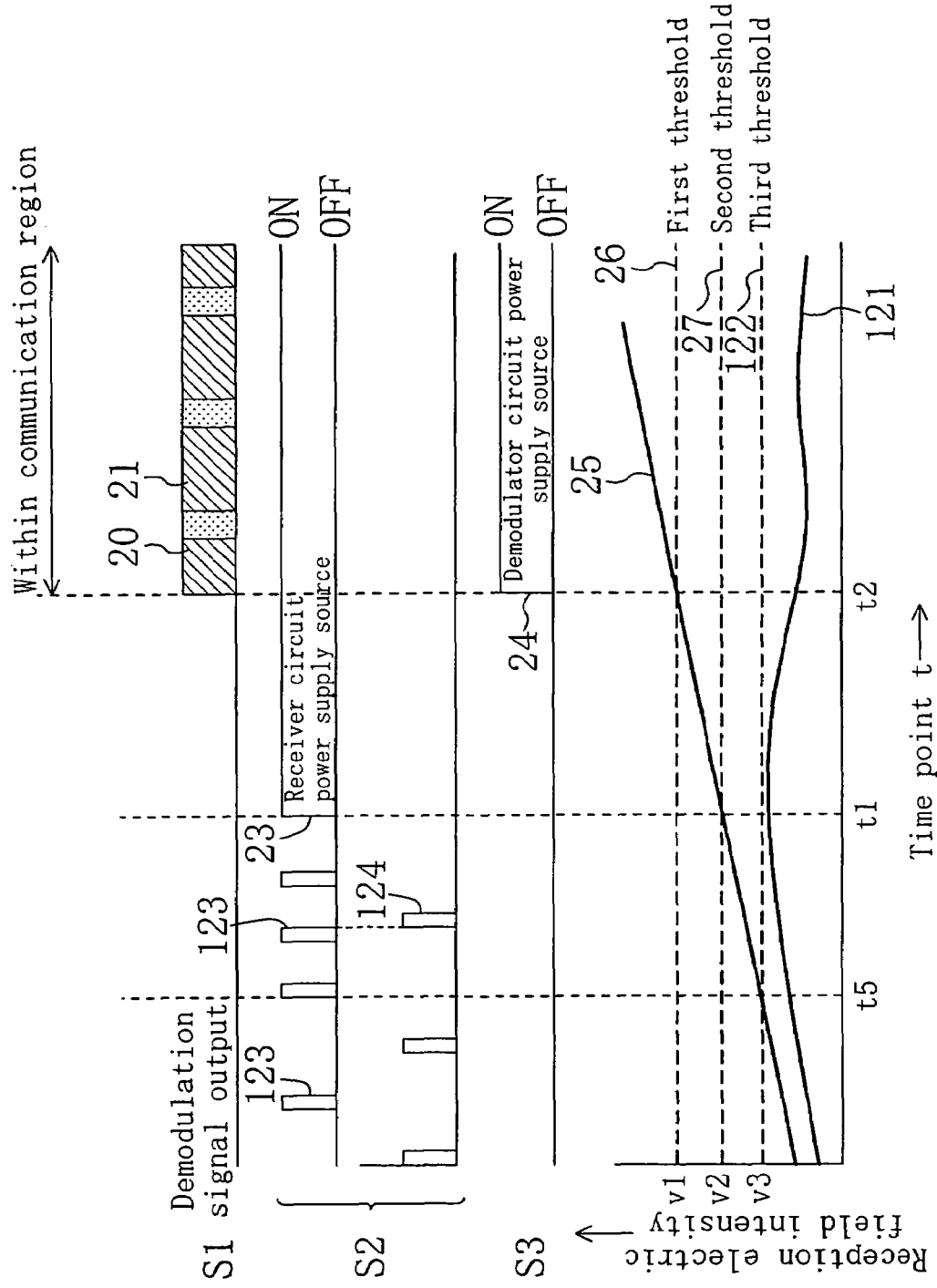
FIG. 14 is a diagram illustrating another method for controlling the receiving device according to the seventh embodiment of the present invention.

FIG. 14 is an illustration showing another exemplary method for controlling the receiving device of this embodiment.

In the example of FIG. 14, when the reception electric field intensity signal 25 of the first communication frequency exceeds the third threshold level v3 and equal to or lower than the second threshold level v2, a period in which only the reception electric field intensity signal 25 of the first communication frequency exceeding the third threshold level v3 is measured and a period in which all communication frequencies (including the first and second communication frequencies) are measured are alternately repeated at regular intervals. That is, in this example, reception electric field intensity measurement is performed so that measurement for a communication frequency (the second communication frequency) equal to or lower than the third threshold level v3 is skipped.

Using this method, the entire measuring time can be reduced, so that power consumption can be reduced.

Eighth Embodiment

Figure 15:
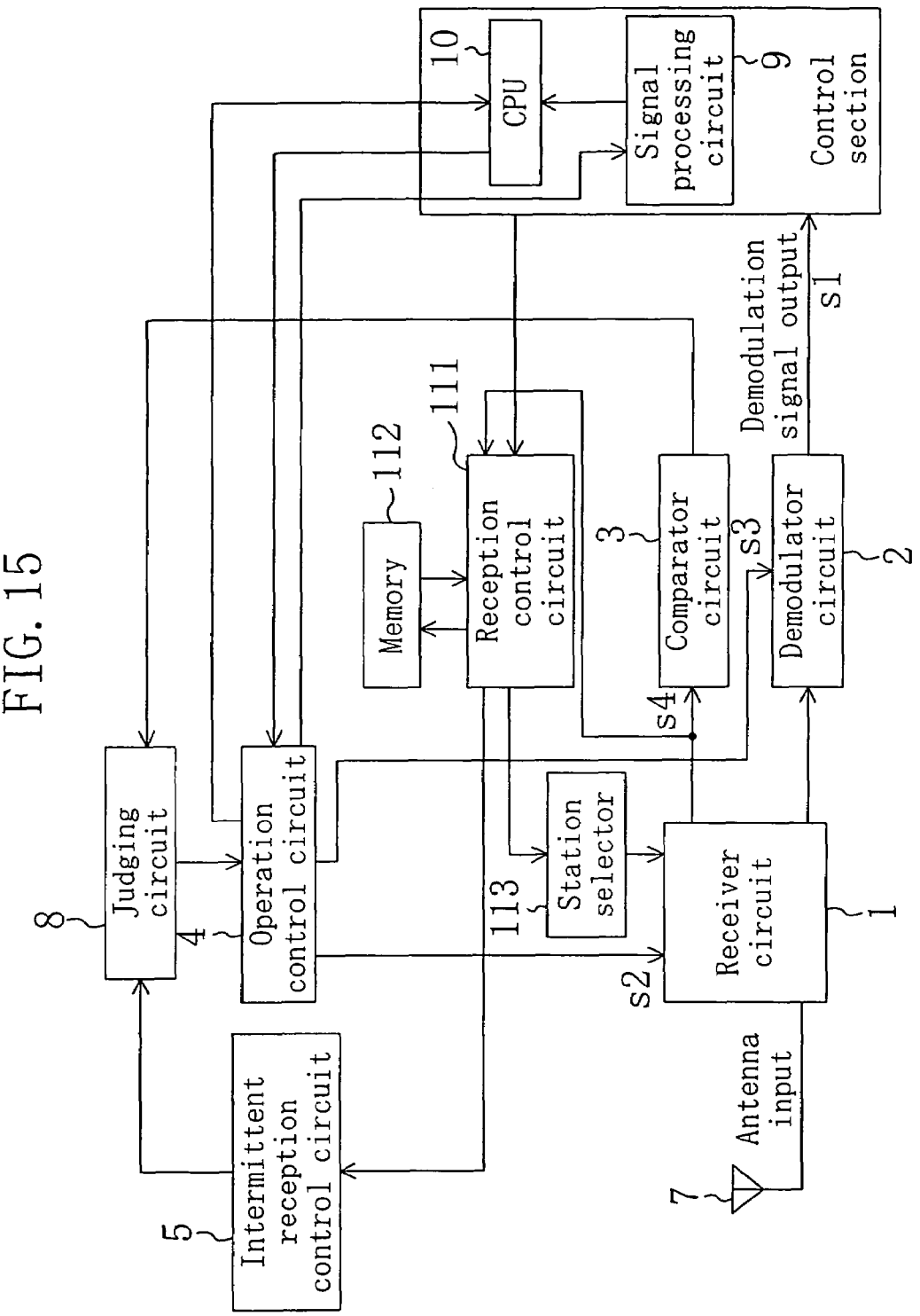
FIG. 15 is a block diagram illustrating the configuration of a receiving device according to an eighth embodiment of the present invention.

FIG. 15 is a block diagram illustrating the configuration of a receiving device according to an eighth embodiment of the present invention. Unlike the seventh embodiment, the receiving device of this embodiment is characterized in that the reception control circuit 111 measures the rate of change in reception electric field intensity and changes an intermittent reception time (receiving time) for each electric field intensity according to the rate of change in reception electric field intensity. As shown in FIG. 15, the receiving device of this embodiment includes a receiver circuit 1 for receiving a signal via an antenna 7 and outputting a reception filed intensity of the received signal as a reception filed intensity signal, a demodulator circuit 2 for demodulating the signal processed by the receiver circuit 1 and outputting the signal, a comparator circuit 3 for comparing the level of the reception electric field intensity signal output from the receiver circuit 1 with a first threshold and a second threshold and judging the level of the reception electric field intensity signal. Moreover, the receiving device of this embodiment further includes an intermittent reception control circuit 5 for outputting a signal for intermittently measuring the reception electric field intensity signal and an operation control circuit 4 for controlling supply of power supply voltage to the receiver circuit 1 and the demodulator circuit 2. Furthermore, the receiving device of this embodiment includes a station selector 113 for selecting a communication frequency while the power of the receiver circuit 1 is ON and outputting a selection result to the receiver circuit 1, a reception control circuit 111 for selecting a plurality of communication frequencies in order using the station selector 113 and measuring the rate of change in reception electric field intensity of each of the plurality of communication frequency, and a memory 112 for storing a measurement result of the reception control circuit 111. Also, the receiving device of this embodiment includes a judging circuit 8 for changing control of the operation control circuit 4 according to a judgment result of the comparator circuit 3, a signal processing circuit 9 and a CPU 10 each for processing a demodulation signal output from the demodulator circuit 2.

Figure 16:
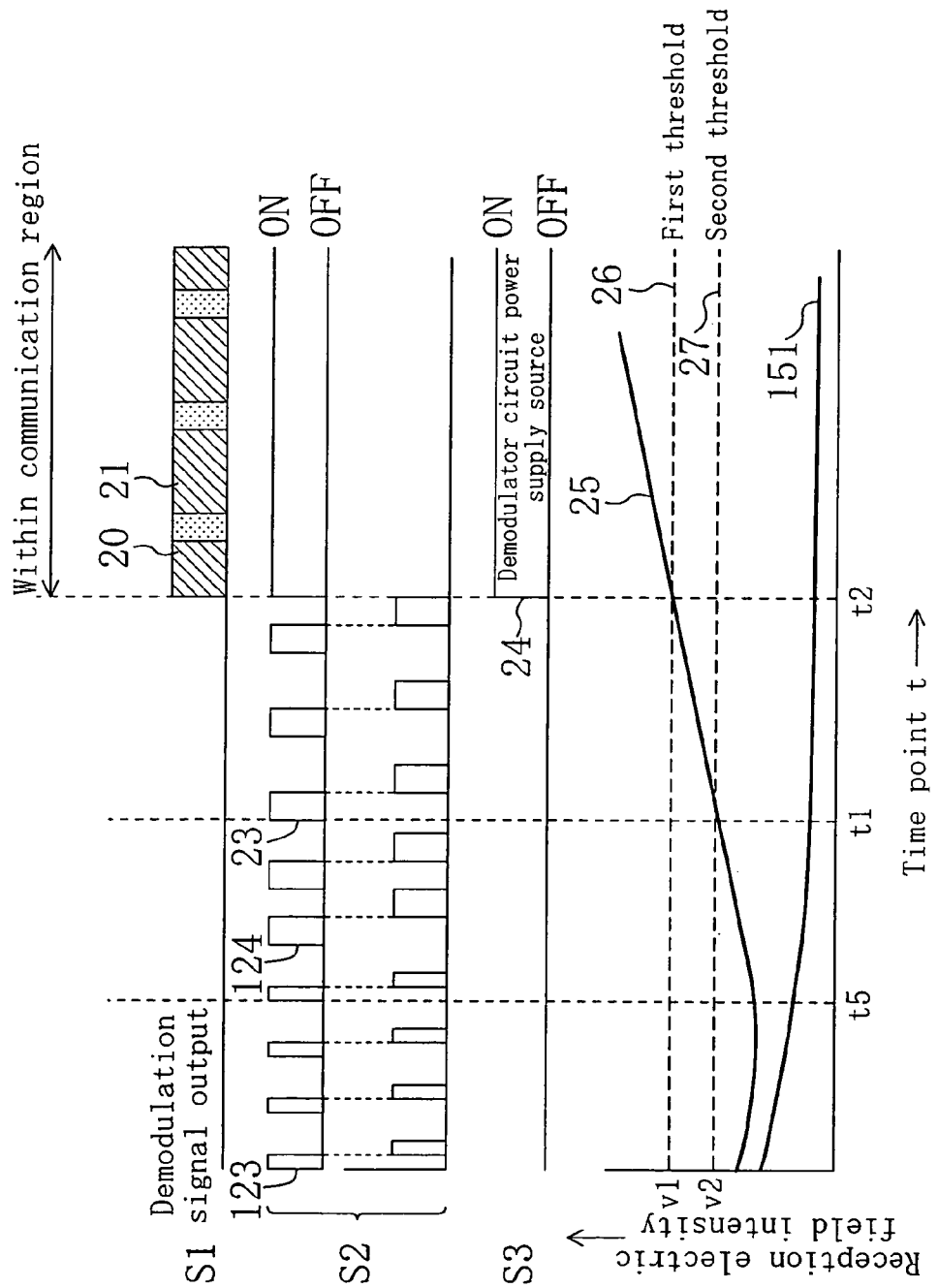
FIG. 16 is a diagram illustrating a method for controlling the receiving device according to the eighth embodiment of the present invention.

Next, the operation of the receiving device of this embodiment will be described with reference to FIGS. 15 and 16. FIG. 16 is a diagram illustrating a method for controlling the receiving device of FIG. 15.

The receiving device of this embodiment is used when a plurality of communication frequencies are transmitted from a base station. In this case, a signal segment 20 is part of a demodulation signal of a selected communication frequency in which information to a mobile station is contained and a signal segment 21 is part of the demodulation signal of the selected communication frequency in which information to the mobile station is not contained. Moreover, in FIG. 16, reception electric field intensity signals 25 and 151 show change with time in the reception field intensity v for two communication frequencies. In this case, a reception electric field intensity signal at a first communication frequency is the reception electric field intensity signal 25 and a reception electric field intensity signal of a second communication frequency is the reception electric field intensity signal 151.

When the receiving device approaches to a base station from the outside of a communication area of the base station and the reception electric field intensity signal 25 of the first communication frequency is equal to or higher than the second threshold level v2, the intermittent reception control circuit 5 turns ON/OFF the power of the receiver circuit 1 at regular intervals. While the power of the receiver circuit 1 is ON, the selector 113 performs selection from the plurality of frequencies in order and the reception control circuit 111 measures the rate of change with time (a difference in terms of a unit time) in reception electric field intensity v of each of the communication frequencies, based on a selection made by the station selector 113. When none of respective reception electric field intensities of the plurality of communication frequencies is on the increase, reception electric field intensity measurement is performed for the first and second communication frequencies at the same intervals for the same time (the intermittent reception segment 123 in FIG. 16).

When the rate of change in the reception electric field intensity signal 25 of the first communication frequency is changed to be a positive value at the time point t5 and the rate of change in the reception electric field intensity signal 151 of each of other frequencies is negative or 0, the reception control circuit 111 stores in the memory 112 information that the reception electric field intensity signal 25 of the first communication frequency is on the increase. At this time, weighting is performed to determine, according to the rate of change in the reception electric field intensity signal 25, which accurate measurement or rough measurement is to be performed and the determination is also stored in the memory 112. For example, assume that accurate measurement is performed for the first communication frequency and measurement is continuously performed for the second communication. During this period, according to a judgment result (difference judgment result) for the rate in the change stored in the memory 112, for the first frequency v of which the reception electric field intensity is on the increase, sampling in which a time for measuring the reception electric field intensity v is set to be a sufficient time for removing the effects of other frequency signals is performed and measurement for other ones of the communication frequencies (such as the second communication frequency) is performed over a time which is sufficient for judging the presence of an electric wave to be received and is shorter than a measuring time for the signal of the first communication frequency.

Next, when the reception electric field intensity of the signal of the first communication frequency exceeds the second threshold 27 at the time point t1, the comparator circuit 3 judges that the receiving device approaches a communication area and outputs a judgment result to the judging circuit 8 and the reception control circuit 111.

In response to the output, the reception control circuit 111 makes the selector 113 select a signal of the first communication frequency, based on the judgment result of the comparator circuit 3. The receiving device enters the receiver circuit power ON segment 23 from an intermittent reception state to be in a continuous reception state and continuously measures the reception electric field intensity v.

Thereafter, when the reception electric field intensity v of the signal of the first communication frequency exceeds the first threshold 26 at the time point t2, the comparator circuit 3 judges that the receiving device has entered a communication area and outputs a judgment result to the judging circuit 8. Thus, independently from an output of the intermittent reception control circuit 5, the operation control circuit 4 supplies power supply voltage to the demodulator circuit 2 and the demodulator circuit power segment 24 begins. Accordingly, the signal input from the antenna 7 to the demodulator circuit 2 via the receiver circuit 1 is output as a demodulation signal to the signal processing circuit (not shown). In this embodiment, the case where two communication frequencies exist has been described. However, if three or more communication frequencies exist, signal reception and measurement can be performed in the same manner as described above.

With the receiving device of this embodiment, control over the power of only necessary components of the receiving device such as the receiver circuit and the demodulator circuit is allowed in small area communication such as dedicated short range communication and wireless LAN communication. Thus, even when a plurality of communication frequencies exist, the best communication frequency can be selected. Accordingly, in the receiving device of this embodiment, power consumption in a reception standby status when the receiving device is outside of a communication area is reduced and, when a received signal is judged to have a predetermined communication frequency, highly accurate measurement can be performed over a long time. Moreover, it takes only a short time to perform measurement of the reception field intensities of signals of other frequencies than the desired communication frequency. Thus, the entire measuring time can be also reduced, so that power consumption can be effectively reduced.

When a digital circuit is used for the receiver circuit or the demodulator circuit, even if a clock signal is controlled, instead of power supply source, the same effect can be achieved and power consumption can be reduced. Moreover, when the reception electric field intensity of signal of one of communication frequencies has turned to increase, instead of reducing the measuring time for other ones of the communication frequencies, the cycle of electric field intensity measurement for other ones of the communication frequencies may be lengthened.

Ninth Embodiment

Figure 17:
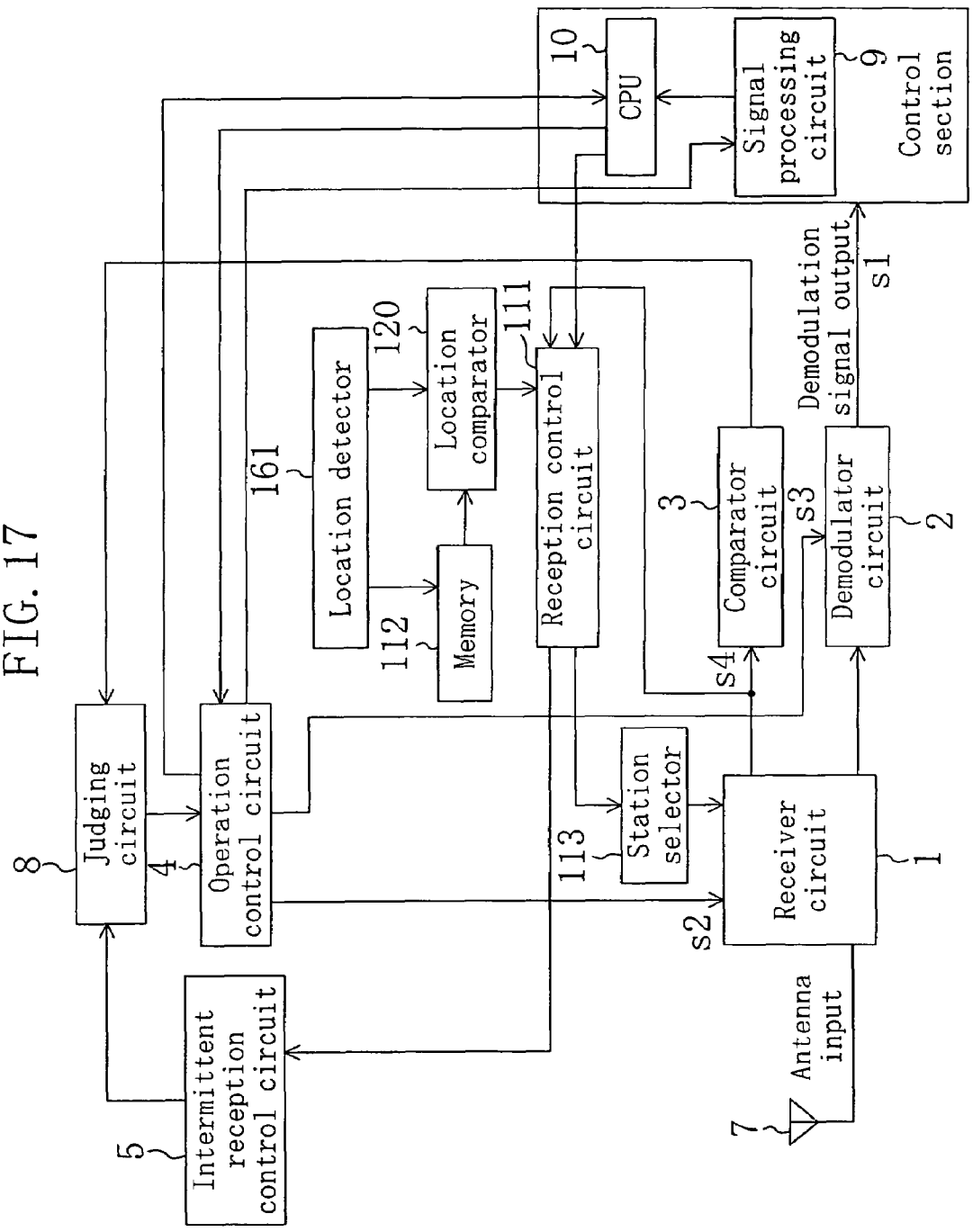
FIG. 17 is a block diagram illustrating the configuration of a receiving device according to a ninth embodiment of the present invention.

FIG. 17 is a block diagram illustrating the configuration of a receiving device according to a ninth embodiment of the present invention. As shown in FIG. 17, the receiving device of this embodiment includes a receiver circuit 1 for receiving a signal via an antenna 7 and outputting a reception filed intensity of the received signal as a reception filed intensity signal and a demodulator circuit 2 for demodulating the signal processed by the receiver circuit 1 and outputting the signal. Moreover, the receiving device of this embodiment further includes a comparator circuit 3 for comparing the level of the reception electric field intensity signal output from the receiver circuit 1 with a first threshold and a second threshold and judging the level of the reception electric field intensity signal and an intermittent reception control circuit 5 for outputting a signal for intermittently measuring the reception electric field intensity signal. Furthermore, the receiving device of this embodiment includes an operation control circuit 4 for controlling supply of power supply voltage to the receiver circuit 1 and the demodulator circuit 2, a station selector 113 for selecting a communication frequency while the power of the receiver circuit 1 is ON, and a location detector 161 for measuring the location of the receiving device. The receiving device of this embodiment also includes a memory 112 for storing the location of a base station and the communication frequency and a reception control circuit 111 for making the station selector 113 selects a communication frequency. The receiving device includes a location comparator circuit 120 for comparing an output of the location detector 161 with location information from the memory 112 and judging a distance between the receiving device and a base station, a judging circuit 8 for changing control of the operation control circuit 4 according to a judgment result of the comparator circuit 3, a signal processing circuit 9 and a CPU 10 each for processing a demodulation signal output from the demodulator circuit 2. Note that the location detector 161 is, for example, a car navigation system or the like in which a GPS system is mounted and is the same as the location detector 91 of the sixth embodiment.

Figure 18:
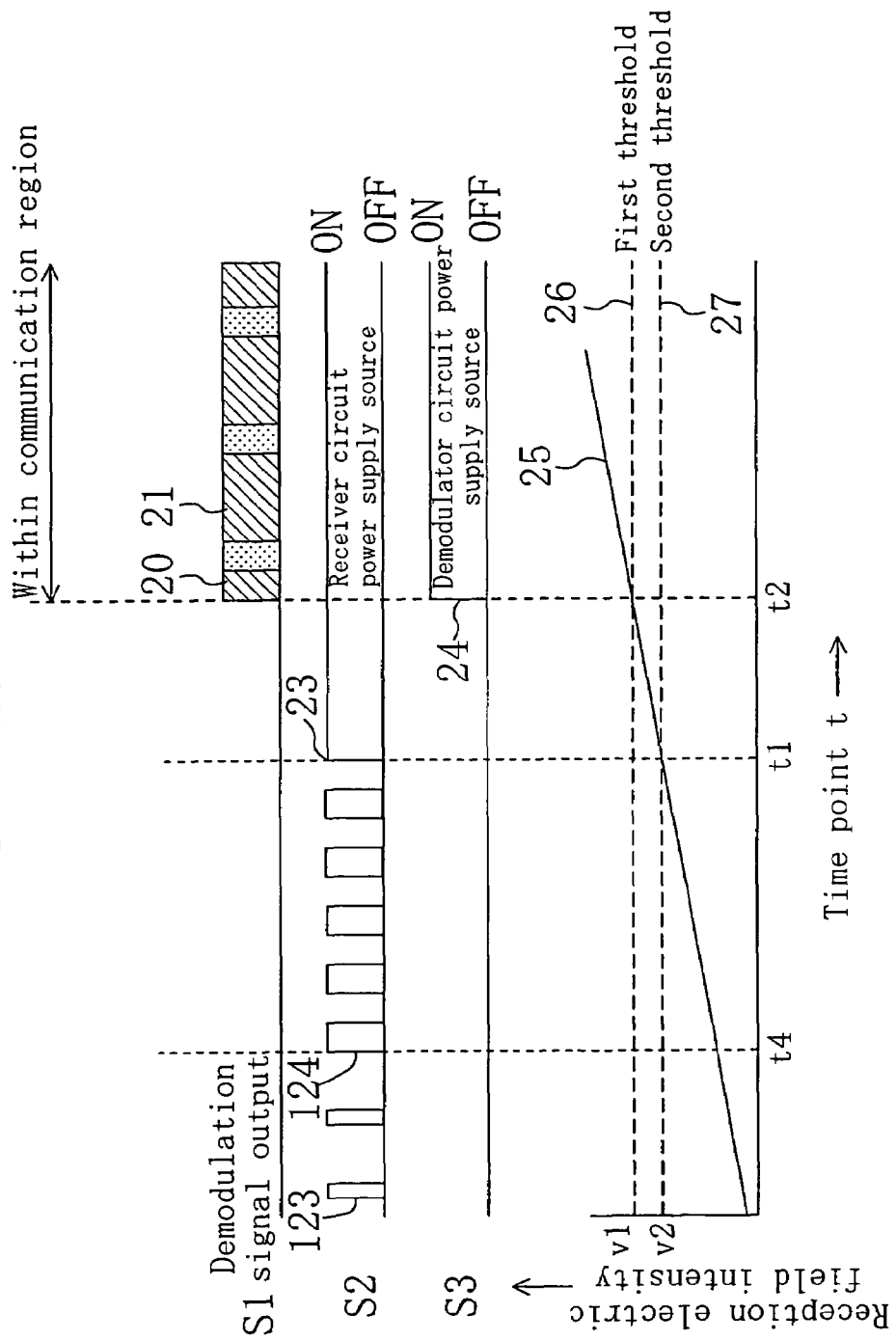
FIG. 18 is a diagram illustrating a method for controlling the receiving device according to the ninth embodiment of the present invention.

Next, the operation of the receiving device of this embodiment will be described with reference to FIGS. 17 and 18. FIG. 18 is a diagram illustrating a method for controlling the receiving device of FIG. 17.

The receiving device of this embodiment is used when a plurality of communication frequencies exist. In this case, the location comparator circuit 120 measures the location of the receiving device by the location detector 161, compares the measurement result with an output of the memory 112 in which the location of a base station and a communication frequency have been previously stored, and judges a distance between the receiving device and the base station. The judgment result is input to the reception control circuit 111. If the location comparator circuit 120 judges that the receiving device is located far from the base station and the reception electric field intensity signal 25 is equal to or lower than the second threshold level v2, the intermittent reception control circuit 5 performs intermittent reception in an intermittent reception segment 123. In this case, simple reception electric field intensity measurement which is sufficient for judging the presence of an electric wave to be received is performed for all the communication frequencies in each ON segment.

Next, when the receiving device approaches the base station and the comparator circuit 3 judges that the reception electric field intensity of a signal of a communication frequency of the base station is equal to or lower than the second threshold, the reception control circuit 111 selects the communication frequency of the base station stored in the memory 112 using the station selector 113 and performs sampling in which a time for measuring reception electric field intensity is set to be a sufficient time for removing the effects of other frequency signals. Measurement for other ones of the communication frequencies is performed over a time which is sufficient for judging the presence of an electric wave to be received and is shorter than a measuring time for the signal of the communication frequency stored in the memory 112.

Subsequently, when the receiving device further approaches the base station and the reception electric field intensity signal 25 exceeds the second threshold level v2 at the time point t1, the comparator circuit 3 judges that the receiving device approaches a communication area, the reception control circuit 111 selects a communication frequency exceeding the second threshold level v2 using the station selector 113, and the power of the receiving circuit 1 is kept continuously ON by the operation control circuit 4. Then, the receiving device enters the receiver circuit power ON segment (continuous reception segment) 23 from an intermittent reception state to be in a continuous reception state and continuously measures the reception electric field intensity.

Thereafter, when the reception electric field intensity signal 25 exceeds the first threshold level v1 at the time point t2, the comparator circuit 3 judges that the receiving device has entered a communication area and outputs a judgment result to the judging circuit 8. Accordingly, the power of the demodulator circuit 2 is turned ON by the operation control circuit 4 and the demodulator circuit power ON segment 24 begins. Thus, the received signal input into the demodulator circuit 2 from the antenna 7 via the receiver circuit 1 is output as a demodulated circuit.

With the receiving device of this embodiment, even when a plurality of communication frequencies exist in a short area communication such as dedicated short range communication and a wireless LAN communication, the best communication frequency can be efficiently selected using the location of a base station and information for communication frequencies previously stored in the memory.

Furthermore, in the receiving device of this embodiment, highly accurate measurement can be performed in a reception standby status when the receiving device is outside of a communication area, over a long time, and for the communication frequency of a base station which the receiving device approaches, and measurement can be performed for other frequencies, in a simple manner, and over a short time. Thus, the entire measuring time can be also reduced, so that power consumption can be reduced. Moreover, power is supplied to only necessary components of the receiving device such as the receiver circuit and the demodulator circuit, thereby reducing power consumption.

The receiving device of this embodiment is characterized in that intermittent reception control is performed to a signal of the communication frequency of a base station previously stored in the memory 112. For a base station of which information is not stored in the memory 112, the location detector 161 measures the location of a new base station when the base station is found and stores with its communication frequency in the memory 112. Thus, the stored information can be used when the receiving device passes the base station next.

Tenth Embodiment

Figure 19:
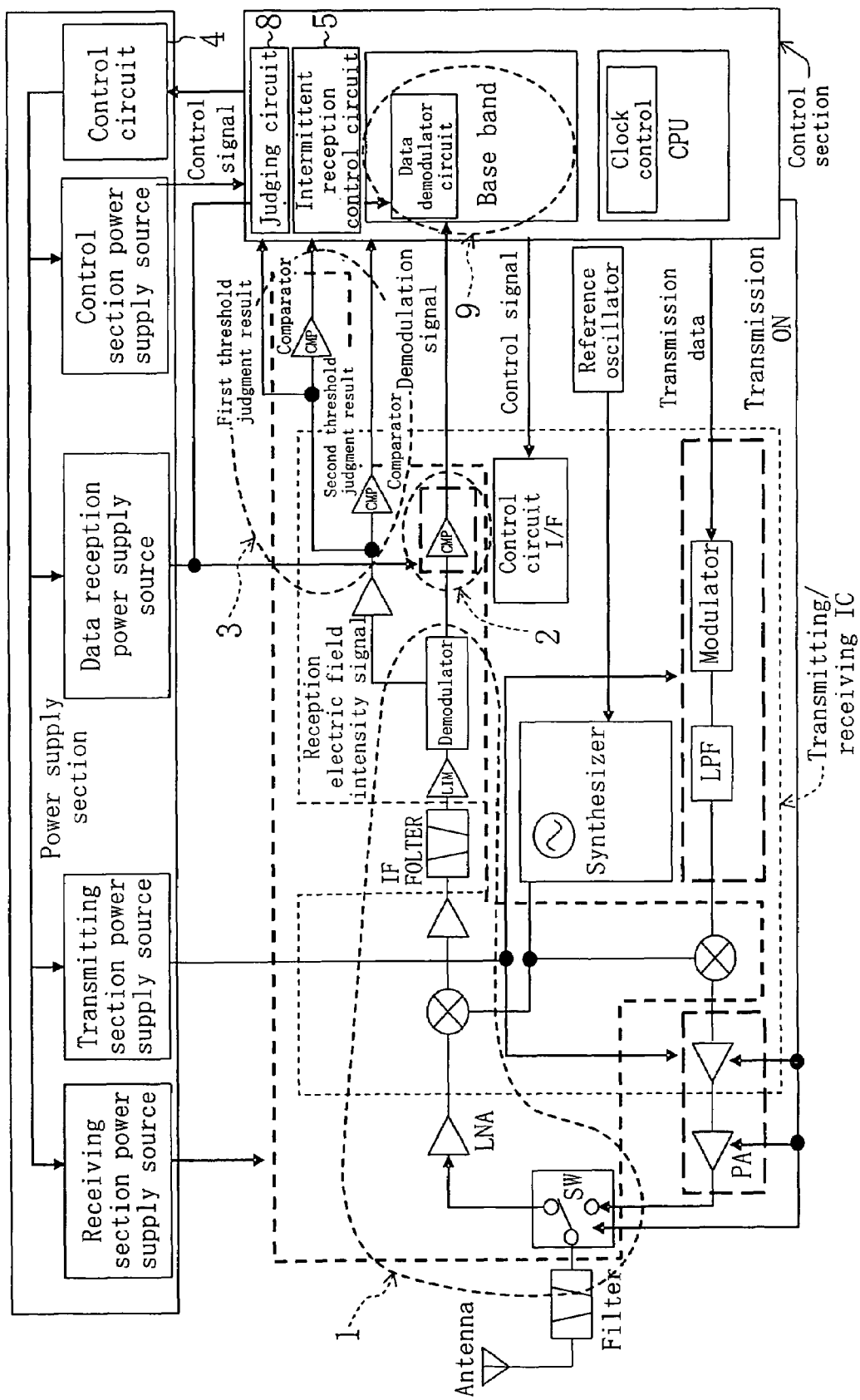
FIG. 19 is a circuit diagram of a semiconductor integrated circuit for a receiving device according to a tenth embodiment of the present invention.

FIG. 19 is a diagram illustrating a communication semiconductor integrated circuit including a receiving device according to a tenth embodiment of the present intention. That is, FIG. 19 shows a circuit diagram of the receiving device of the present invention. Note that each member also described in the above-described embodiments is identified by the same reference numeral and therefore the detail description thereof will be omitted. FIG. 19 shows a specific example for each of the receiver circuit 1, the demodulator circuit 2, the comparator circuit 3, the intermittent receiver circuit 5, the operation control circuit 4, the judging circuit 8, the signal processing circuit 9 and the CPU 10 described in each of the above-described embodiment.

The communication semiconductor integrated circuit of this embodiment includes any one of the receiving devices of the first through ninth embodiments of the present invention integrated and provided on a semiconductor chip. Specifically, in the semiconductor integrated circuit of this embodiment for use in a receiving device, all or some of the receiver circuit 1, the demodulator circuit 2, the comparator circuit 3, the intermittent control circuit 5, the operation control circuit 4, the judging circuit 8, the signal processing circuit 9 and the CPU 10 are integrated on a semiconductor substrate.

Thus, a device for transmitting/receiving information to/from a base station may be integrated on a single chip.

Note that, for example, the transmitting/receiving IC of FIG. 19 and a control section can be integrated on another semiconductor chip.

Eleventh Embodiment

A transmitting/receiving device according to an eleventh embodiment of the present invention is obtained by implementing on a circuit substrate any one of the receiving devices of the first through ninth embodiments of the present invention, a base band circuit (signal processing circuit) for processing a modulation signal which has been received or generating a transmission modulation signal, and a transmitting device for generating a transmission signal based on the transmission modulation signal.

The transmitting/receiving device of this embodiment is small and can be incorporated in a wireless communication system in a simple manner. The transmitting/receiving device can be also made to be in a reception standby state at a low consumption current when being outside of a communication area, so that interactive communication between the device and a base station (roadside wireless communication system).

The transmitting/receiving device has the same effects even if the device has a structure in which the receiving device, the base band circuit and the transmitting device are mounted on separate substrates, respectively.

Twelfth Embodiment

A transmitting/receiving device according to a twelfth embodiment includes any one of the receiving devices of the first through ninth embodiments, a base band circuit (signal processing circuit) for processing a received modulation signal or generating a transmission modulation signal, a transmitting device for generating a transmission signal based on the transmission modulation signal, and an antenna. Moreover, the transmitting/receiving device may further include a CPU. With the configuration, interactive communication between the device and a base station (roadside wireless communication system) becomes possible and power consumption when the device is outside of a communication area can be reduced.

In such a transmitting/receiving device, when high-speed and large-volume data exchange is necessary, for example, in paying a toll using ETC system, in obtaining information using DSRC, in interactively exchanging information with GPS, or in paying at a gas station, information can be exchanged between a base station and a moving station.

Thirteenth Embodiment

Figure 20:
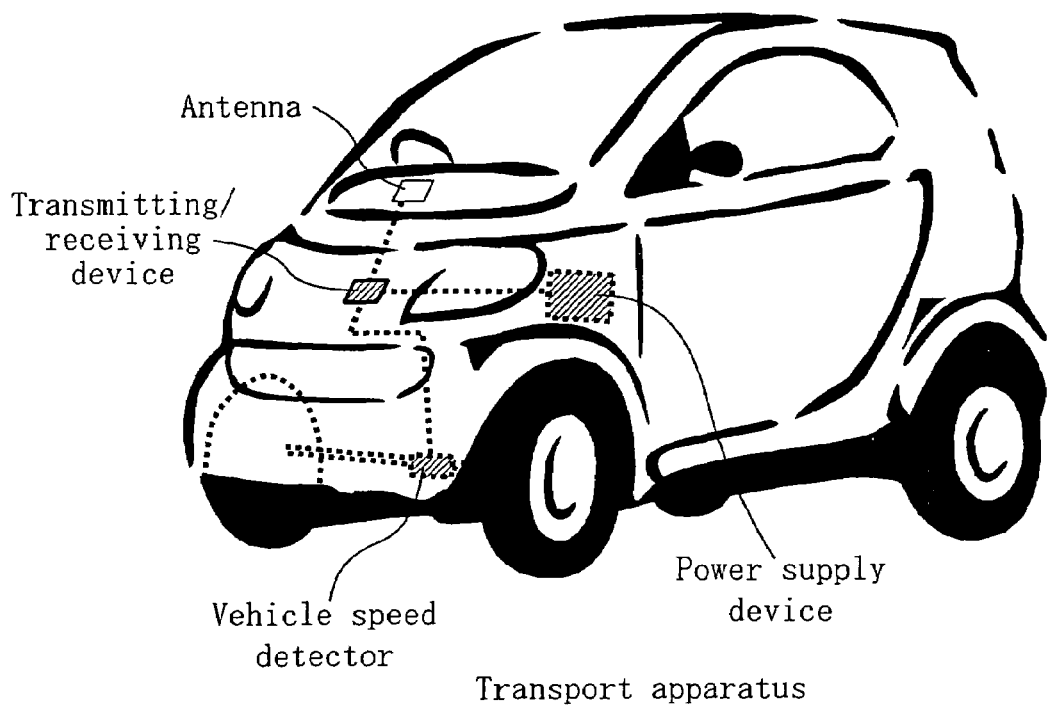
FIG. 20 is an illustration of a transport apparatus according to a thirteenth embodiment of the present invention.

FIG. 20 is an illustration of a transport apparatus according to a thirteenth embodiment of the present invention. The transport apparatus includes any one of the receiving devices (for example, an ETC system to be mounted in a passenger car) of the above-described embodiments being mounted therein.

As shown in FIG. 20, the transport apparatus of this embodiment includes the transmitting/receiving device of the twelfth embodiment, a power supply device, and an antenna. A vehicle speed detection device corresponds to, for example, the speed detector 31 of FIG. 4 and may be provided outside of the receiving device.

With this configuration, even when the transport apparatus moves, delay in start of receiving a signal is reduced and a receiving circuit performs intermittent reception when the transport apparatus is out of communication area. Thus, power consumption in communication standby state can be reduced to a lower level than that of a known transport apparatus.

If, for example, the receiving device of the present invention is used for a DSRC system including seven communication frequencies, control can be performed such that for a frequency having a small reception electric field intensity (i.e., a signal for transmitting unnecessary information at a predetermined place), an intermittent interval becomes long and a receiving time becomes short. Thus, excessive power consumption can be reduced.

Fourteenth Embodiment

Figure 21A:
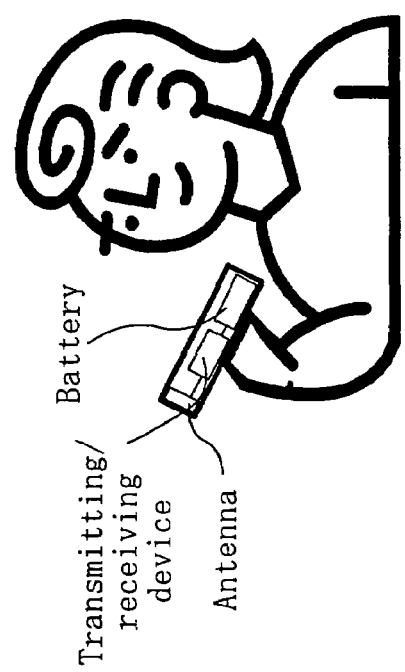
FIGS. 21A and 21B are illustrations describing a transportable wireless communication system according to a fourteenth embodiment of the present invention.
Figure 21B:
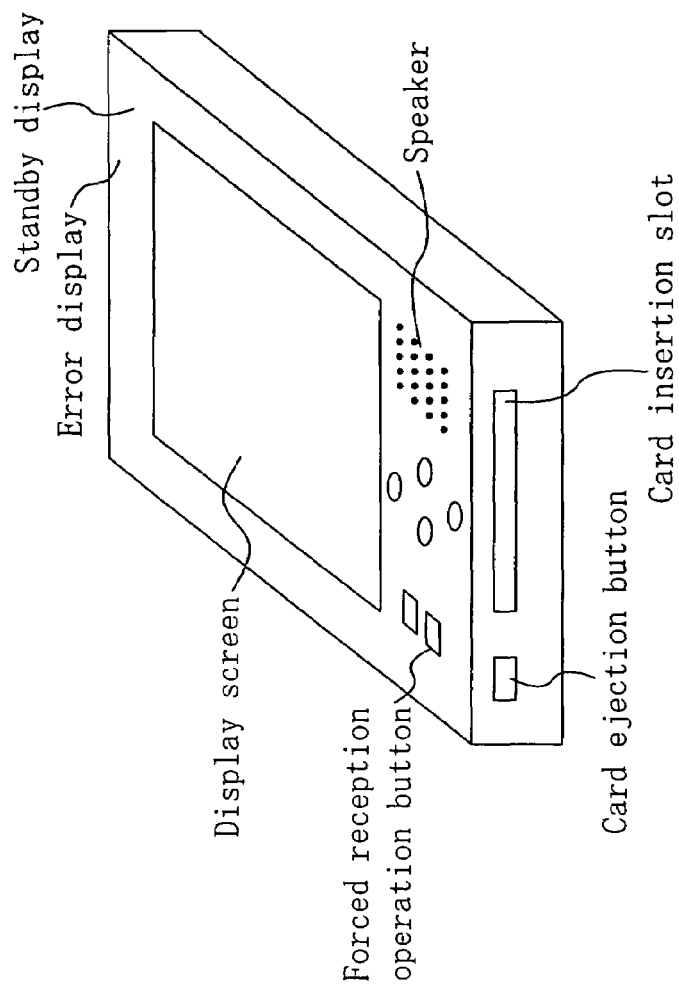

FIGS. 21A and 21B are illustrations describing a transportable wireless communication system according to a fourteenth embodiment of the present invention.

As shown in FIG. 21A, the transportable wireless communication system includes the transmitting/receiving device having an antenna and described in the eleventh embodiment and a battery functioning as a power source for external transmitting/receiving device.

FIG. 21B is an enlarged view of a transmitting/receiving device. The transmitting/receiving device includes control buttons for controlling a function menu displayed on a display screen, a card insertion slot into which a card such as a credit card is inserted, a card ejection button, a liquid crystal display screen for displaying information received from a base station, a forced reception operation button for manually turning ON the power of the receiving device, an error display section for displaying a communication error with a base station, and a standby display section for indicating that the receiving device is in a state in which communication with a base station can be started. By pressing the forced reception operation button, even when the level of an electric field intensity signal is not over the second threshold, the receiving device can be switched from an intermittent reception state to a continuous reception state. Therefore, when the attitude of the receiving device is not stable and the receiving device can not receive a reception electric filed intensity because the receiving device is transportable, the situation where start of receiving a signal is delayed as the receiving device approaches a desired base station can be avoided.

With this configuration, a transmitting/receiving device according to the present invention can be used for other applications than an application to a transmitting/receiving device for a vehicle and a range of use of a transmitting/receiving device according to the present invention can be widened. For example, the transportable wireless communication system can be taken along anywhere and thus, for example, is capable of receiving information such as interpretation transmitted in a theme park. Also, communication can be established in any place and any occasion such as at the goal in a marathon for checking runners' results. In a receiving device according to the present invention, each circuit is operated at a time point where the operation of the circuit is required, thus allowing reduction in power consumption. Therefore, the portable wireless communication system can be operated for a long time on a single charge of a battery. Moreover, when a function menu is displayed on a display, a user can select an item from the menu to display information and make a payment with a credit card.

Fifteenth Embodiment

A receiving device according to the present invention is useful in a wireless communication system. Use of any one of the receiving devices of the first through ninth embodiment of the present invention for a base station and moving station allows wireless interactive communication between the base station and the moving station. In the case where neither a base station nor a moving station is within a communication possible area, intermittent reception is performed in either one of the base station and the moving station so as to make the receiving device in a communication standby state. Thus, power consumption can be reduced.

Sixteenth Embodiment

Figure 22:
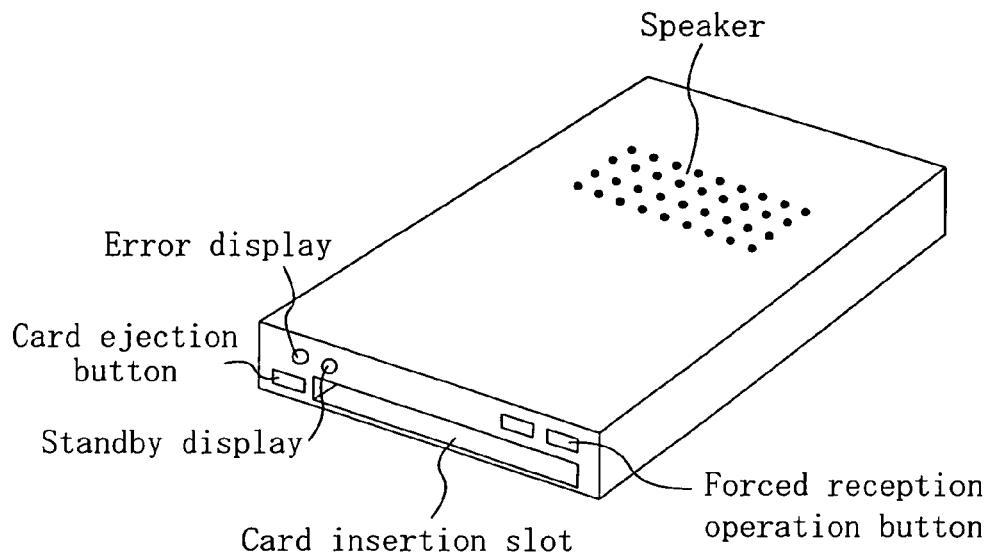
FIG. 22 is an illustration of an example for transmitting/receiving device and transport apparatus according to a sixteenth embodiment of the present invention.

FIG. 22 is an illustration of an exemplary communication system according to a sixteenth embodiment of the present invention. As shown in FIG. 22, the communication system of this embodiment includes any one of the receiving devices of the first through ninth embodiments of the present invention, an error display section for displaying a communication error with a base station, a standby display section for indicating that communication with a base station is possible, and a speaker for issuing warning. By inserting a card (not shown) as an external component into a card insertion slot, communication with the base station becomes possible. For example, if the level of an electric field intensity signal exceeds the second threshold without a card inserted in the slot, the standby display section flashes or the speaker issues warning to urge insertion of a card. Thus, in a communication possible area with a base station, a communication error between the communication system and a base station can be prevented.

Furthermore, as in the fourteenth embodiment, the communication system of this embodiment may include a forced reception operation button for turning ON the power of the receiver circuit to allow communication with a base station.

In each of the above-described embodiments, the case where the power of the receiving circuit 1 is turned ON at the time point t1 where the reception electric field intensity signal 25 exceeds the second threshold level v2 has been described. However, the power of the receiving circuit 1 can be turned ON at any time at least during a period between the time point t1 and the time point t2 and the present invention is realized as long as the power of the receiving circuit 1 is ON without delay at the time point t2 which indicates that the moving station enters a communication area.

Note that in each of the drawings according to the above-described embodiments, the case where the signal segment 20, i.e., part of a received demodulation signal in which information to the mobile station is contained and the signal segment 21, i.e., part of the received signal in which information to the mobile station is not contained are alternately repeated with certain intervals has been described. However, it is needless to say that the present invention is not limited thereto. Also, the case where as soon as the moving station enters a communication area, a demodulation signal is output from the signal segment 20 has been described. However, a demodulation signal may be output at a time point where the signal segment 21 begins and, needless to say, a demodulation signal may be output with delay.

The receiving device of the present invention described above is preferably used for a communication system used in small area communication, represented by dedicated short range communication and wireless LAN communication.

What is claimed is:

1. A receiving device for receiving a signal transmitted from a base station, the device comprising:
   a receiver circuit for outputting a reception electric field intensity of a signal received via an antenna as a reception electric field intensity signal;
   a comparator circuit for comparing a level of the reception electric field intensity signal output from the receiver circuit using a first threshold indicating that the receiving device is in a communication area and a second threshold which is lower than the first threshold and indicates a continuous field measurement level and outputting a result of the comparison;
   an intermittent reception control circuit for outputting a periodic signal for intermittently operating the receiver circuit; and
   an operation control circuit for controlling an operation of the receiver circuit based on a comparison result of the comparator circuit,
   wherein, based on the comparison result of the comparator circuit, if the level of the reception electric field intensity signal is lower than the second threshold, the operation control circuit makes the receiver circuit perform intermittent operation based on the periodic signal and if the level of the reception electric field intensity signal is equal to or higher than the second threshold, the operation control circuit makes the receiver circuit perform a continuous operation.

2. The receiving device of claim 1, wherein the receiver circuit further includes the function of amplifying and outputting the received signal,
   wherein the receiving device further includes a demodulator circuit for demodulating the amplified signal and outputting the signal as a modulation signal, and
   wherein the operation control circuit controls an operation of the demodulator circuit.

3. The receiving device of claim 2, wherein, based on the comparison result of the comparator circuit, the operation control circuit operates the demodulator circuit when the level of the reception electric field intensity signal exceeds the first threshold.

4. The receiving device of claim 2, wherein, based on the comparison result of the comparator circuit, the operation control circuit supplies a first clock signal to the demodulator circuit when the level of the reception electric field intensity signal exceeds the first threshold.

5. The receiving device of claim 2, further comprising:
   a signal processing circuit for processing the demodulation signal output from the demodulator circuit; and
   a processing unit for arithmetically processing the demodulation signal processed by the signal processing circuit,
   wherein, based on the comparison result of the comparator circuit, the operation control circuit supplies a second clock signal to the signal processing circuit and the processing unit to control the signal processing circuit and the processing unit when the level of the reception electric field intensity signal is lower than the second threshold.

6. The receiving device of claim 1, wherein the second threshold has a first boundary value which is smaller than the second threshold and a second boundary value which is larger than the second threshold,
   wherein an operation of the receiver circuit is changed from an intermittent operation to a continuous operation when the level of the reception electric field intensity signal is increased to exceed the second boundary value, and
   wherein the operation of the receiver circuit is changed from a continuous operation to an intermittent operation when the level of the reception electric field intensity signal is reduced to be equal to the first boundary value.

7. The receiving device of claim 1, further comprising a speed detector for detecting a moving speed of the receiving device and outputting the detected speed as a speed signal, wherein the comparator circuit changes the second threshold according the speed signal.

8. The receiving device of claim 7, wherein when the moving speed of the receiving device is increased, the comparator circuit changes the second threshold so that a difference between the first threshold and the second threshold becomes larger.

9. The receiving device of claim 1, wherein the intermittent reception control circuit changes the periodic signal according to the reception electric field intensity signal.

10. The receiving device of claim 9, wherein when the level of the reception electric field intensity signal becomes high, the intermittent control circuit shortens a cycle of the periodic signal.

11. The receiving device of claim 1, further comprising a speed detector for detecting a moving speed of the receiving device and outputting the detected speed as a speed signal,
wherein the intermittent reception control circuit changes the periodic signal according to the speed signal.

12. The receiving device of claim 11, wherein when the moving speed of the receiving device is increased, the intermittent reception control circuit shortens a cycle of the periodic signal.

13. The receiving device of claim 1, further comprising:
a memory for storing location information for the base station; and
a location detector for detecting a location of the receiving device,
wherein the intermittent reception control circuit changes the periodic signal according to a result of comparison between the location of the base station stored in the memory and the result of detection by the location detector.

14. The receiving device of claim 13, wherein the intermittent reception control circuit shortens a cycle of the periodic signal when a distance between the base station and the receiving device is decreased.

15. The receiving device of claim 1, further comprising:
a reception control circuit for controlling a receiving time which it takes for the receiver circuit to receive the signal via the antenna,
wherein the comparator circuit compares a level of the reception electric intensity signal with the first threshold, the second threshold, and a third threshold which is lower than the second threshold and indicating whether or not the signal to be received exists, and
wherein, as the comparison result of the comparator circuit, when the level of the reception electric field intensity signal exceeds the third threshold, the reception control circuit increases the receiving time so that the receiving time becomes longer than the receiving time when the level of the reception electric field intensity signal is equal to or lower than the third threshold.

16. The receiving device of claim 15, wherein the intermittent reception control circuit increases a cycle of the periodic signal when the level of the reception electric field intensity signal is equal to or lower than the third threshold.

17. The receiving device of claim 1, further comprising a reception control circuit for measuring a rate of change in the reception electric field intensity,
wherein the reception control circuit changes, according to the rate of change, a receiving time which it takes for the receiver circuit to receive the signal.

18. The receiving device of claim 1, further comprising:
a reception control circuit for controlling a receiving time which it takes for the receiver circuit to receive the signal;
a memory for storing a location of the base station and frequency information of the signal transmitted from the base station; and
a location detector for detecting a location of the receiving device,
wherein the reception control circuit changes the receiving time according to a result of comparison between the location of the base station stored in the memory and a detection result of the location detector.

19. The receiving device of claim 18, wherein when a distance between the base station and the receiving device is reduced, the receiving time is increased.

20. The receiving device of claim 18, further comprising a station selector for selecting, from signals of a plurality of frequencies, a frequency signal which the receiver circuit is to receive, based on an output of the reception control circuit,
wherein, as the result comparison of the comparator circuit, the station selector selects from the plurality of frequency signals a frequency signal having a reception electric field intensity level exceeding the second threshold and the receiver circuit receives the selected frequency signal.

21. The receiving device of claim 1, wherein the first threshold is in a range of −70 dBm or more and −60 dBm or less, and
wherein the second threshold is in a range from −90 dBm or more and −70 dBm or less.

22. A semiconductor integrated circuit comprising:
a semiconductor substrate; and
the receiving device of claim 1 integrated on the semiconductor device.

23. A transmitting/receiving device comprising:
the receiving device of claim 1;
a transmitting device for outputting a signal processed by the receiving device to the base station; and
an antenna for receiving a signal transmitted from the base station, outputting the received signal to the receiving circuit, and also outputting the signal output from the transmitting device to the base station.

24. The transmitting/receiving device of claim 23, further comprising a notifying section for notifying, the comparison result of the comparator circuit, that the level of the reception electric field intensity signal has exceeded the second threshold.

25. A transport apparatus comprising:
the transmitting/receiving device of claim 23; and
a power supply device for supplying power to the transmitting/receiving device.

26. A portable transmitting/receiving device comprising:
the transmitting/receiving device of claim 23; and
a battery for supplying power to the transmitting/receiving device.

27. A communication system comprising;
the receiving device of claim 1; and
a transmitting device for transmitting a signal processed by the receiving device the base station.

28. A method for receiving a signal using a receiving device for receiving a signal transmitted from a base station, the method comprising:
a first step of receiving the signal via an antenna by a receiver circuit;
a second step of outputting a reception electric field intensity of the received signal as a reception electric field intensity signal from the receiver circuit;
a third step of comparing the level of the reception electric field intensity signal with a first threshold indicating that the receiving device is in a communication area and a second threshold which is lower than the first threshold and indicates a continuous field measurement start level;

a fourth step of making, if the level of the reception electric field intensity signal is lower than the second threshold, as a result of the comparison, the receiver circuit perform an intermittent operation; and a fifth step of making, if the level of the reception electric field intensity signal is equal to or higher than the second threshold, as a result of the comparison, the receiver circuit perform a continuous operation.

29. The method of claim 28, further comprising a sixth step of making, if the level of the reception electric field intensity signal is equal to or higher than the first threshold, as a result of the comparison, a demodulator circuit for demodulating the signal received by the receiver circuit perform an operation.

30. The method of claim 29, wherein in the sixth step, a clock signal for demodulation operation is given to the demodulator circuit.

31. The method of claim 28, wherein each of the fourth step and the fifth step includes the step of giving a clock signal to a signal processing circuit for processing a signal output from the receiver circuit and a processing unit for arithmetically processing the signal.

32. The method of claim 28, wherein the third step includes the step of comparing the level of the reception electric field intensity signal with the second threshold by hysterisis control using a first boundary value which is lower than the second threshold and a second boundary value which is higher than the second threshold.

33. The method of claim 28, further comprising before the third step:

a seventh step of detecting a moving speed of the receiving device and outputting the moving speed as a speed signal; and an eighth step of changing the second threshold according to the speed signal.

34. The method of claim 33, wherein in the eighth step, when the moving speed is increased, the second threshold is changed so that a difference between the first threshold and the second threshold is increased.

35. The method of claim 28, wherein the fourth step includes a ninth step of changing a cycle of the intermittent operation according to the reception electric field intensity signal.

36. The method of claim 35, wherein in the ninth step, when the level of the reception electric field intensity signal is high, the cycle of the intermittent operation is shortened.

37. The method of claim 28, further comprising:

a tenth step of detecting a moving speed of the receiving device and outputting the detected moving speed as a speed signal; and an eleventh step of changing a cycle of the intermittent operation according to the speed signal.

38. The method of claim 37, wherein in the eleventh step, when the moving speed is increased, the cycle of the intermittent operation is shortened.

39. The method of claim 28, further comprising:

the step of detecting a location of the receiving device; and the step of calculating a distance between a location of the base station stored in the receiving device and the detected location of the receiving device, wherein the fourth step further includes a twelfth step of changing a cycle of the intermittent operation according to the calculated distance.

40. The method of claim 39, wherein in the twelfth step, when the distance between the base station and the receiving device is reduced, the cycle of the intermittent operation is shortened.

41. The method of claim 28, wherein the third step further includes the step of comparing the level of the reception electric field intensity signal with a third threshold which indicates whether or not a signal to be received exists is lower than the second threshold and, wherein the fourth step includes the step of increasing, if the level of the reception electric field intensity signal exceeds the third threshold, as a result of the comparison, a receiving time of the receiver circuit so that the receiving time is longer than a receiving time when the level of the reception electric field intensity signal is equal to or lower than the third threshold.

42. The method of claim 28, wherein the fourth step includes the step of changing a receiving time which it takes for the receiver circuit to receive the signal, according to a rate of change in the reception electric field intensity.

43. The method of claim 28, further comprising:

the step of detecting a location of the receiving device; and the step of calculating a distance between a location of the base station stored in the receiving device and the detected location of the receiving device, wherein the fourth step includes the step of changing a receiving time which it takes for the receiver circuit to receive the signal according to the calculated distance.

44. The method of claim 28, further comprising, after the third step, the step of selecting, from the plurality of received signals, a signal with a reception electric field intensity signal having a level equal to or higher than the second threshold.

45. The method of claim 28, wherein the fifth step includes the step of notifying that the level of the reception electric field intensity signal is equal to or higher than the second threshold.

* * * * *